US012664209B2

(12) United States Patent
Lev et al.

(10) Patent No.: US 12,664,209 B2
(45) Date of Patent: Jun. 23, 2026

(54) EFFICIENT CHANGE DETECTION BASED ON DYNAMIC INFORMATION RETRIEVAL

(71) Applicant: GE Precision Healthcare LLC, Waukesha, WI (US)

(72) Inventors: Amitay Lev, Or Akiva (IL); Tamir Yehuda Shazman, Haifa (IL); Nati Daniel, Haifa (IL); Hannah Michele Ornstein, Haifa (IL); Doron Shaked, Tivon (IL); Angeles Perez-Agosto, Leander, TX (US); Gopal Biligeri Avinash, Concord, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/938,635

(22) Filed: Nov. 6, 2024

(65) Prior Publication Data

US 2026/0127223 A1     May 7, 2026

(51) Int. Cl.
*G06F 16/535* (2019.01)
*G06F 16/22* (2019.01)
*G06F 16/2457* (2019.01)

(52) U.S. Cl.
CPC ........ *G06F 16/535* (2019.01); *G06F 16/2264* (2019.01); *G06F 16/24578* (2019.01)

(58) Field of Classification Search
CPC ............. G06F 16/535; G06F 16/24578; G06F 16/2264
See application file for complete search history.

(56) References Cited

U.S. PATENT DOCUMENTS

| | | | | |
|---|---|---|---|---|
| 6,393,054 B1* | 5/2002 | Altunbasak | ............ | H04N 5/147 |
| | | | | 715/835 |
| 2007/0167760 A1* | 7/2007 | Kim | ....................... | G06V 10/25 |
| | | | | 600/437 |
| 2013/0251274 A1* | 9/2013 | Xie | ......................... | G06V 20/47 |
| | | | | 382/218 |

(Continued)

OTHER PUBLICATIONS

Kirillov, et al. "Segment Anything" arXiv:2304.02643v1 [cs.CV] Apr. 5, 2023, 30 pages.

(Continued)

*Primary Examiner* — Jensen Hu
(74) *Attorney, Agent, or Firm* — Amin, Turocy & Watson, LLP

(57) ABSTRACT

One or more systems, devices, computer program products and/or computer-implemented methods of use provided herein relate to efficient change detection based on dynamic information retrieval by employing foundation models. For example, according to an embodiment, a system is provided. The system can comprise a memory that can store computer executable components. The system can further comprise a processor that can execute the computer executable components stored in the memory, where the computer executable components can comprise a data access component that can accesses multi-dimensional query data and features of interest (FOI) data related to the multi-dimensional query data. The computer executable components can further comprise an artificial intelligence (AI) component that can identify, based on the FOI data, one or more key frames within the multi-dimensional query data.

17 Claims, 14 Drawing Sheets

(56)        References Cited

U.S. PATENT DOCUMENTS

| | | | | |
|---|---|---|---|---|
| 2015/0356195 A1* | 12/2015 | Kilzer | ..................... | H04N 5/85 |
| | | | | 715/234 |
| 2015/0364158 A1* | 12/2015 | Gupte | ................... | H04N 5/144 |
| | | | | 386/223 |
| 2018/0341811 A1* | 11/2018 | Bendale | ................... | G06T 7/70 |
| 2020/0051328 A1* | 2/2020 | Mohan | ................... | G06F 3/012 |
| 2023/0401852 A1* | 12/2023 | Kumar | ................... | G06V 20/41 |

OTHER PUBLICATIONS

Plotka, et al. "Deep learning fetal ultrasound video model match human observers in biometric measurements" Physics in Medicine & Biology, vol. 67, No. 4, 2022, 15 pages.

Sun, et al. "Boosting Breast Ultrasound Video Classification by the Guidance of Keyframe Feature Centers" arXiv:2306.06877v1 [cs. CV] Jun. 12, 2023, 11 pages.

Huang, et al. "Extracting keyframes of breast ultrasound video using deep reinforcement learning" Medical Image Analysis 80 (2022) 102490, 15 pages.

* cited by examiner

1100

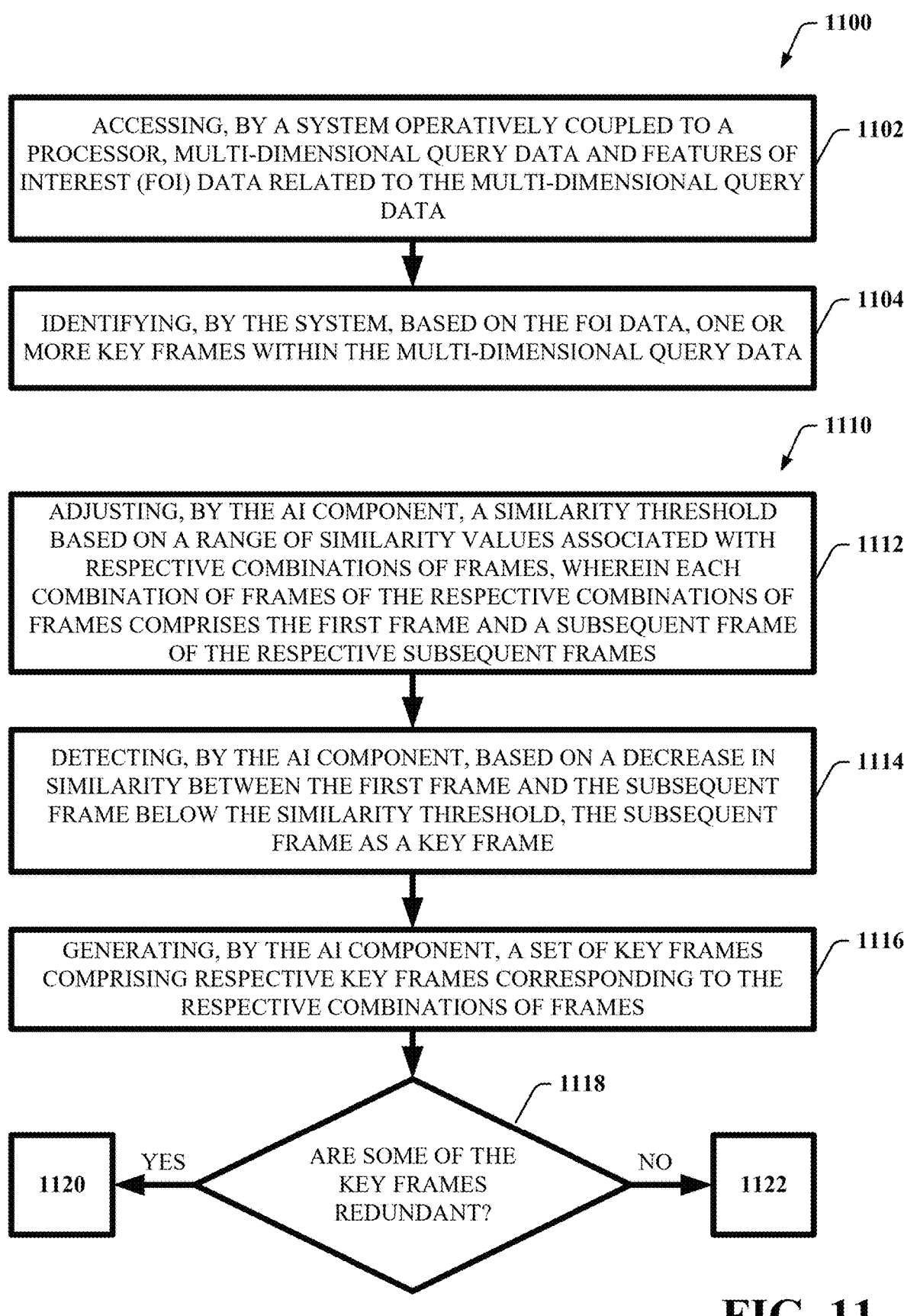

ACCESSING, BY A SYSTEM OPERATIVELY COUPLED TO A PROCESSOR, MULTI-DIMENSIONAL QUERY DATA AND FEATURES OF INTEREST (FOI) DATA RELATED TO THE MULTI-DIMENSIONAL QUERY DATA — 1102

IDENTIFYING, BY THE SYSTEM, BASED ON THE FOI DATA, ONE OR MORE KEY FRAMES WITHIN THE MULTI-DIMENSIONAL QUERY DATA — 1104

1110

ADJUSTING, BY THE AI COMPONENT, A SIMILARITY THRESHOLD BASED ON A RANGE OF SIMILARITY VALUES ASSOCIATED WITH RESPECTIVE COMBINATIONS OF FRAMES, WHEREIN EACH COMBINATION OF FRAMES OF THE RESPECTIVE COMBINATIONS OF FRAMES COMPRISES THE FIRST FRAME AND A SUBSEQUENT FRAME OF THE RESPECTIVE SUBSEQUENT FRAMES — 1112

DETECTING, BY THE AI COMPONENT, BASED ON A DECREASE IN SIMILARITY BETWEEN THE FIRST FRAME AND THE SUBSEQUENT FRAME BELOW THE SIMILARITY THRESHOLD, THE SUBSEQUENT FRAME AS A KEY FRAME — 1114

GENERATING, BY THE AI COMPONENT, A SET OF KEY FRAMES COMPRISING RESPECTIVE KEY FRAMES CORRESPONDING TO THE RESPECTIVE COMBINATIONS OF FRAMES — 1116

1118

ARE SOME OF THE KEY FRAMES REDUNDANT?

YES → 1120

EFFICIENT CHANGE DETECTION BASED ON DYNAMIC INFORMATION RETRIEVAL

BACKGROUND

The subject disclosure relates to artificial intelligence (AI) and, more specifically, to efficient change detection based on dynamic information retrieval by employing foundation models.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable efficient change detection based on dynamic information retrieval by employing foundation models are discussed.

According to an embodiment, a system is provided. The system can comprise a memory that can store computer executable components. The system can further comprise a processor that can execute the computer executable components stored in the memory, where the computer executable components can comprise a data access component that can accesses multi-dimensional query data and features of interest (FOI) data related to the multi-dimensional query data. The computer executable components can further comprise an AI component that can identify, based on the FOI data, one or more key frames within the multi-dimensional query data.

According to another embodiment, a computer-implemented method is provided. The computer-implemented method can comprise accessing, by a system operatively coupled to a processor, multi-dimensional query data, FOI data related to the multi-dimensional query data and a cloud database. The computer-implemented method can further comprise identifying, by the system, from the cloud database, based on the FOI data, a set of images that are similar to the multi-dimensional query data.

According to yet another embodiment, a computer program product is provided. The computer program product can comprise a non-transitory computer readable memory having program instructions embodied therewith, the program instructions executable by a processor to cause the processor to access multi-dimensional query data, FOI data related to the multi-dimensional query data and a cloud database. The program instructions can be further executable by the processor to cause the processor to identify, based on the FOI data, one or more key frames within the multi-dimensional query data.

BRIEF DESCRIPTION OF THE DRAWINGS

One or more embodiments are described below in the Detailed Description section with reference to the following drawings:

FIG. 11 illustrates flow diagrams of example, non-limiting methods that can employ a foundation model to detect key frames in multi-dimensional query data, in accordance with one or more embodiments described herein.

DETAILED DESCRIPTION

Figure 1:
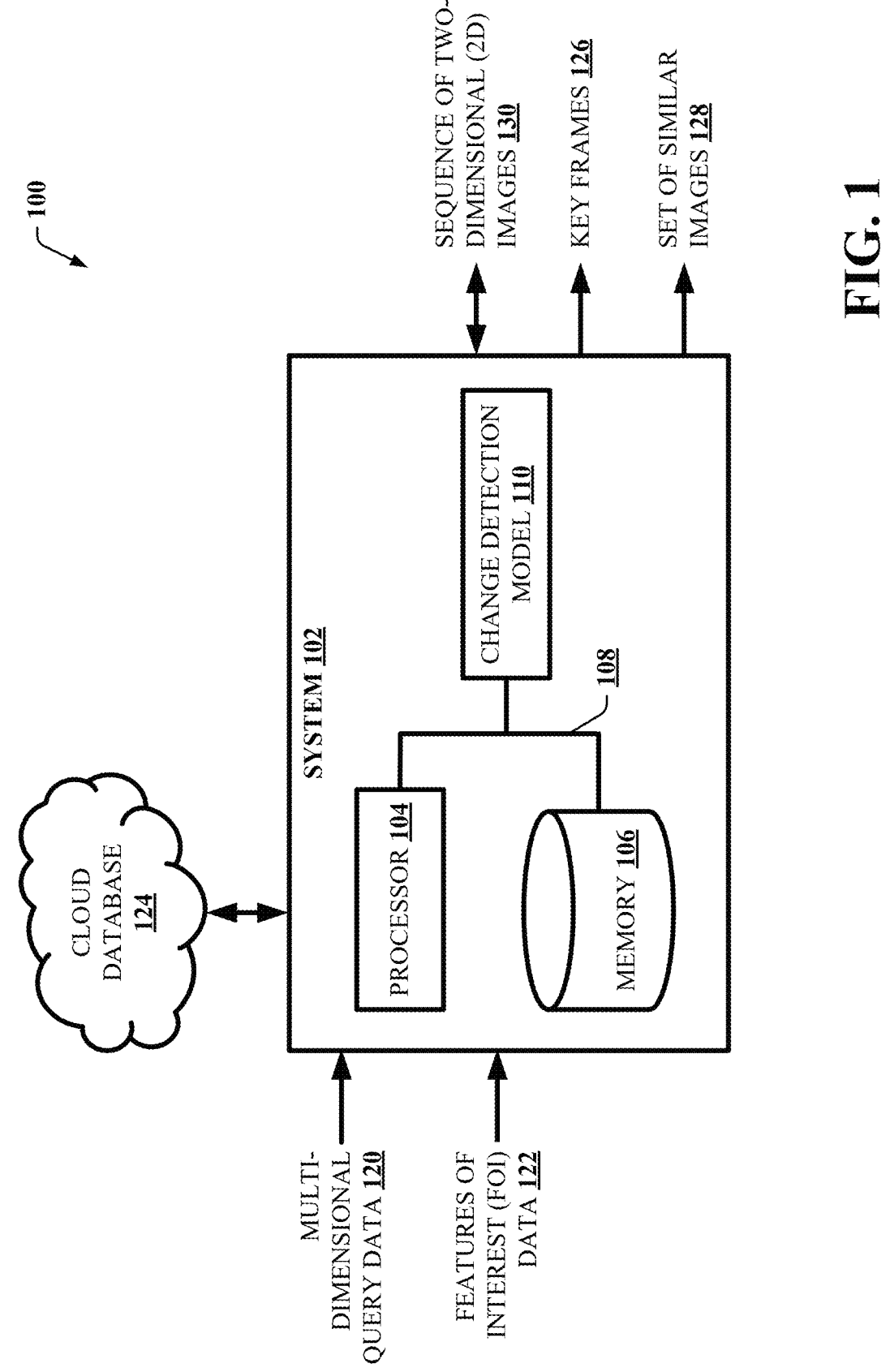
FIG. 1 illustrates a block diagram of an example, non-limiting system that can employ dynamic information retrieval and foundation models to identify key frames in a data sequence or video or retrieve images from a cloud database, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In the context of medical data, two-dimensional (2D), three-dimensional (3D) and four-dimensional (4D) sequences of data (or data sequences) often comprise a wealth of information, but the key frames, that is, images representing changes in scenes, within such multi-dimensional data can be crucial for analysis. Key frames are those frames or images that depict meaningful information from a data sequence and act as markers for where significant changes occur within the data sequence. In traditional data annotation approaches, annotating a sequence of data or a video can often involve a subject matter expert (SME) who watches the sequence multiple times to identify key frames or to randomly select key frames. This is a tedious and time consuming process that also adds to the expenses associated with data annotation tasks. Additionally, manual and/or random selection of key frames can often be inefficient as it can produce too many key frames for annotation or produce key frames that are not significantly different from each other. Thus, methods and techniques that can significantly optimize key frame selection can be desirable.

Various embodiments of the present disclosure can be implemented to produce a solution to these problems. Embodiments described herein include systems, computer-implemented methods, and computer program products that can employ foundation models to efficiently detect changes in multi-dimensional data sequences based on dynamic information retrieval. For example, in various embodiments, a change detection model (or a dynamic change detector) is provided that can address the challenge of involving SMEs to identify key frames when generating annotations. For example, for most medical AI tasks and applications, data annotation can be both expensive and time-consuming, and the change detection model can reduce the time and costs associated with such data annotation by automatically identifying key frames within multi-dimensional data sequences based on changes in specified FOI within the multi-dimensional data sequences.

In one or more embodiments, when applied to local 2D, 3D, or 4D data sequences that can be accessed by the change detection model as multi-dimensional query data (or query dataset), change detection model can employ an AI component to identify key frames within the multi-dimensional query data, based on local FOI data or global FOI data. In one or more embodiments, the local or global FOI data can be accessed by change detection model as a prompt that can be provided by an entity (e.g., hardware, software, machine, AI, neural network and/or user). In various embodiments, the local or global FOI data can direct the focus of AI component to specific regions within the multi-dimensional query data, based on which, AI component can automatically detect key frames. In various embodiments, the AI component can be a domain-specific foundation model that can be trained to detect key frames based on FOI data. As a result, effective key frames can be automatically generated for downstream AI models and annotation tasks, thereby reducing the overall time involved in extensive manual data annotation.

In one or more embodiments, the change detection model can also employ the AI component to retrieve images similar to a 2D query image from a cloud database, wherein the 2D query image can be derived from the multi-dimensional query data. For example, when applied to a global cloud as the query dataset, the AI component can generalize to dynamic image retrieval (DIR), yielding the top similar images based on similar entity interactions that can define local or global FOI in the 2D query image. The top similar images can have a first level of similarity (e.g., an initial level of similarity) to a first key frame detected by the AI component within the multi-dimensional query data, based on parameters such as similarity thresholds provided to change detection model by the entity. In one or more embodiments, SMEs can be involved in the process of identifying the key frames or retrieving the similar images; however, their role shifts to validating the key frames automatically identified by the change detection model. For example, SMEs can assess or provide feedback regarding whether the key frames identified by the change detection model accurately represent anatomical information in the multi-dimensional query data, whether the image quality of each key frame is good/desirable and sufficient for other tasks, whether the key frames can be employed for downstream applications, whether the key frames are better than those generated via random selection, and so on. This additional scrutiny by SMEs can ensure that only high-quality key frames are selected for further analysis. Further, the additional attention/involvement of SMEs can be justified by the agility, simplicity and ease of attaining highly desirable key frames from a medical data sequence. Thus, change detection model can streamline the annotation process for medical AI applications by automating the detection of key frames, thereby saving time and resources while ensuring a desirable quality of annotated data. As a result, SMEs can sift through large amounts of spatial or temporal data to identify key points in time that can assist the SMEs with inspecting the spatial or the temporal data in a speedy manner.

Embodiments of the present disclosure can provide the following technical and customer/patient benefits.

Improved image retrieval: Embodiments of the present disclosure can provide an improved image retrieval method based on cloud databases. For example, in various embodiments, feedback from an entity (e.g., hardware, software, machine, AI, neural network and/or user) can be dynamically incorporated into an image retrieval method based on multi-dimensional query data, wherein the feedback can result in highly effective image retrieval based on both local cloud databases and global cloud databases. Retrieving images from a cloud database can also provide computational benefits in terms of resource optimization, scalability and reduced local hardware requirements.

Enhanced efficiency: Automating the identification of key frames can reduce the time involved in annotating medical data. Consequently, medical professionals can allocate less time to manual key frame selection and focus more on annotation tasks, ultimately delivering superior key frames compared to random selection, in less time.

Faster research and development (R&D): With the streamlined annotation process, medical data bottlenecks can be improved. More effective data that can be generated faster, can lead to agile medical AI systems and R&D phases, thereby reducing the gap between technology and downstream customers.

Cost Savings: Embodiments of the present disclosure can lower costs associated with medical data analysis by reducing the need for extensive manual key frame selection by SMEs and providing more meaningful key frames than random selection. As a result, medical AI technologies can be made more accessible to healthcare providers and ultimately benefit patients.

Although these benefits are described in the context of the healthcare industry, the embodiments of the present disclosure and the corresponding benefits can be extended to industries other than healthcare.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1300 illustrated at FIG. 13. For example, non-limiting system 100 can be associated with, such as accessible via, computing environment 1300 described below with reference to FIG. 13, such that aspects of processing can be distributed between non-limiting system 100 and the computing environment 1300. In one or more described embodiments, computer and/or computing-based elements can be used in connection with implementing one or more of the systems, devices, components and/or computer-implemented operations shown and/or described in connection with FIG. 1 and/or with other figures described herein.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

FIG. 1 illustrates a block diagram of an example, non-limiting system 100 that can employ dynamic information retrieval and foundation models to identify key frames in a data sequence or video or retrieve images from a cloud database, in accordance with one or more embodiments described herein.

Non-limiting system 100 and/or the components of non-limiting system 100 can be employed to use hardware and/or software to solve problems that are highly technical in nature (e.g., related to AI, foundation models, dynamic information retrieval, etc.), that are not abstract and that cannot be performed as a set of mental acts by a human. Further, some of the processes performed may be performed by specialized computers for carrying out defined tasks related to efficient change detection based on dynamic information retrieval by employing foundation models. Non-limiting system 100 and/or components of non-limiting system 100 can be employed to solve new problems that arise through advancements in technologies mentioned above, and/or the like. Non-limiting system 100 can provide technical improvements to AI systems by increasing the speed of generating annotations on data generated by different imaging modalities, reducing the expenses/costs associated with generating annotations and providing more deterministic, robust and optimized annotation processes that can generate more effective and scalable annotations with a desirable annotation accuracy as compared to existing annotation techniques.

Annotation tasks are often outsourced. The manual selection of key frames for annotations means that annotations are typically expensive/costly, and the embodiments of the present disclosure can allow for cost effective annotation processes by automating the selection of key frames, which can be a fundamental pillar of medical AI development. Additionally, the embodiments of the present disclosure can ensure that the automatically selected key frames represent significantly different scenes in input data sequence (e.g., multi-dimensional query data), thereby providing more effective data for annotation as compared to random selection. Further, the embodiments of the present disclosure can be applied across product lines, can be extended to various types of customers, and can be employed in areas other than healthcare.

Discussion turns briefly to processor 104, memory 106 and bus 108 of non-limiting system 100. For example, in one or more embodiments, non-limiting system 100 can comprise processor 104 (e.g., computer processing unit, microprocessor, classical processor, and/or like processor). In one or more embodiments, a component associated with non-limiting system 100, as described herein with or without reference to the one or more figures of the one or more embodiments, can comprise one or more computer and/or machine readable, writable and/or executable components and/or instructions that can be executed by processor 104 to enable performance of one or more processes defined by such component(s) and/or instruction(s).

In one or more embodiments, non-limiting system 100 can comprise a computer-readable memory (e.g., memory 106) that can be operably connected to processor 104. Memory 106 can store computer-executable instructions that, upon execution by processor 104, can cause processor 104 and/or one or more other components of non-limiting system 100 (e.g., change detection model 110, data access component 202, AI component 204, redundant key frames component 206, data parsing component 208, highest similarity level component 210 and/or data generation component 212) to perform one or more actions. In one or more embodiments, memory 106 can store computer-executable components (e.g., change detection model 110, data access component 202, artificial intelligence (AI) component 204, redundant key frames component 206, data parsing component 208, highest similarity level component 210 and/or data generation component 212).

Non-limiting system 100 and/or a component thereof as described herein, can be communicatively, electrically, operatively, optically and/or otherwise coupled to one another via bus 108. Bus 108 can comprise one or more of a memory bus, memory controller, peripheral bus, external bus, local bus, and/or another type of bus that can employ one or more bus architectures. One or more of these examples of bus 108 can be employed. In one or more embodiments, non-limiting system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of non-limiting system 100 can reside in the cloud, and/or can reside locally in a local computing environment (e.g., at a specified location(s)).

Figure 2:
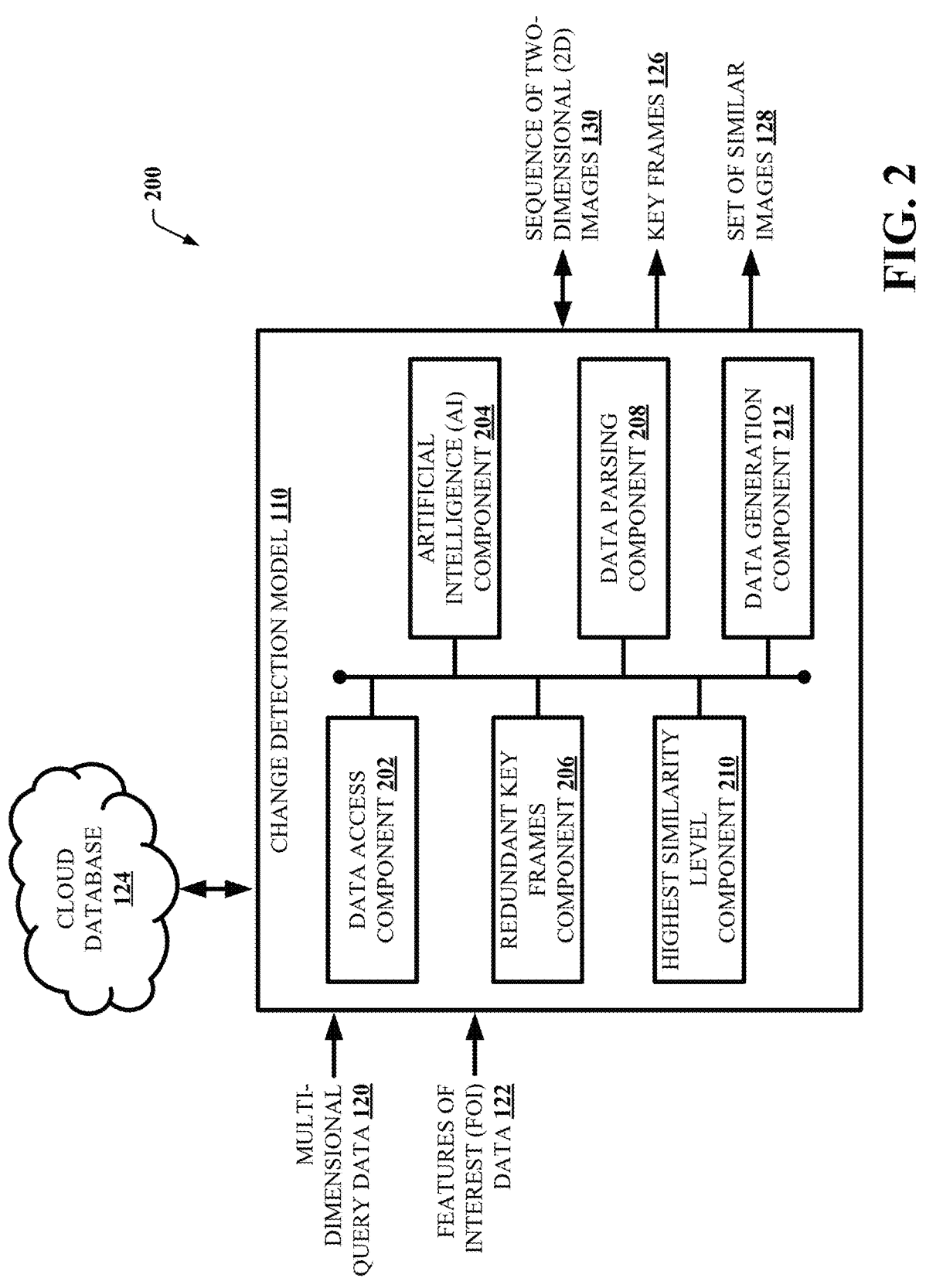
FIG. 2 illustrates another block diagram of an example, non-limiting system that can employ dynamic information retrieval and foundation models to identify key frames in a data sequence or video or retrieve images from a cloud database, in accordance with one or more embodiments described herein.

In various embodiments, system 102 can comprise change detection model 110. As illustrated in FIG. 2, change detection model 110 can comprise data access component 202, AI component 204, redundant key frames component 206, data parsing component 208, highest similarity level component 210 and data generation component 212. In various embodiments, data access component 202 can access multi-dimensional query data 120 and FOI data 122 related to the multi-dimensional query data. In one or more embodiments, multi-dimensional query data 120 can comprise a sequence of images having a format selected from a group consisting of 2D data, 3D data and 4D data. For example, multi-dimensional query data 120 can comprise a sequence of medical images of specific regions within the human anatomy. In one or more embodiments, multi-dimensional query data can also be video data. For example, multi-dimensional query data 120 can comprise a video showing movement in a region of the human anatomy. In one or more embodiments, FOI data 122 can comprise local FOI data, wherein the local FOI data can have a format selected from a group consisting of textual data, mask data, points and bounding boxes (or Bboxes). Textual data can comprise annotations or other types of text data to label objects within data. Mask data refers to a type of data representation commonly employed in tasks such as computer vision, image processing and other applications. Points refer to a data type that represents specific locations in a coordinate space. Bounding boxes are boxes having imaginary geometric shapes that can define the spatial extent of an object or region of interest within an image or in space. In one or more embodiments, FOI data 122 can comprise global FOI data, wherein the global FOI data can comprise images marked as positive images or negative images. FOI data 122 can point or direct AI component 204 to specific focus areas within a dataset or image. For example, FOI data 122 can point AI component 204 to a specific fetus organ/fetal organ within a fetal ultrasound image. In various embodiments, FOI data 122 can be provided as a prompt or query data by an entity (e.g., hardware, software, machine, AI, neural network and/or user) to system 102 via a graphical user interface (GUI) at a device (e.g., desktop computer, laptop, tablet, smartphone, etc.).

Identifying Key Frames from Query Data:

In various embodiments, AI component 204 can act as an automatic key frames detector. For example, in one or more embodiments, AI component 204 can identify or detect, based on FOI data 122, one or more key frames 126 within multi-dimensional query data 120. For example, data parsing component 208 can parse multi-dimensional query data 120 into a sequence of 2D images 130 while maintaining a data sequence of multi-dimensional query data 120, and AI component 204 can identify the one or more key frames 126 based on the sequence of 2D images 130 derived from multi-dimensional query data 120 by data parsing component 208. Identifying the one or more key frames 126 based on FOI data 122 can reduce an amount of time spent by an entity (e.g., hardware, software, machine, AI, neural network and/or user), such as the entity providing FOI data 122, in inspecting large amounts of spatial or temporal data.

In an embodiment, AI component 204 can detect differences between a first frame (i.e., a current frame) comprised in multi-dimensional query data 120 and respective subsequent frames comprised in multi-dimensional query data 120 to identify the one or more key frames 126. To detect the differences, AI component 204 can adjust a similarity threshold or similarity score based on a range of similarity values associated with respective combinations (or segments) of frames, wherein each combination of frames of the respective combinations of frames can comprise the first frame and a subsequent frame of the respective subsequent frames. For example, in an implementation, AI component 204 can adjust the similarity threshold dynamically by calculating a difference between the maximum and minimum similarity scores for frames (i.e., subsequent frames) following a current query image in a sequence of frames. Further, AI component 204 can select an arbitrary threshold, such as, for example, 0.4, based on the range of minimum and maximum similarity scores, and by selecting the arbitrary threshold, the system (i.e., AI component 204) can better adapt to varying conditions amongst frames and improve its accuracy in dynamic situations. This approach can ensure that the similarity threshold remains relevant to the specific context of the subsequent frames. Further, AI component 204 can detect, based on a decrease in similarity between the first frame and a subsequent frame below the similarity threshold, the subsequent frame as a key frame for the specific combination of frames. AI component 204 can perform such a detection for each combination of frames comprising the first frame and a subsequent frame. Finally, AI component 204 can generate a set of key frames comprising respective key frames corresponding to the respective combinations of frames.

Alternatively, in another embodiment, AI component 204 can detect differences between a window comprised in multi-dimensional query data 120 and respective subsequent frames comprised in multi-dimensional query data 120 to identify the one or more key frames 126, wherein a window can represent a number of neighboring elements (e.g., frames) based on a sorted similarity score or temporal order from which a next level of difference (e.g., a next different frame) can be considered. For example, to detect the differences, AI component 204 can adjust a similarity threshold based on a range of similarity values associated with respective combinations of frames, wherein each combination of frames of the respective combinations of frames can comprise the window and a subsequent frame of the respective subsequent frames. Further, AI component 204 can detect, based on a decrease in similarity between the window and a subsequent frame below the similarity threshold, the subsequent frame as a key frame for the specific combination of frames. AI component 204 can perform such a detection for each combination of frames comprising the window and a subsequent frame. Finally, AI component 204 can generate a set of key frames comprising respective key frames corresponding to the respective combinations of frames.

In various embodiments, redundant key frames component 206 can extract the one or more key frames 126 from the set of key frames generated by AI component 204. For example, redundant key frames component 206 can employ a redundant key frames filter (e.g., redundant key frames filter 604 of FIG. 6) to filter the set of key frames and eliminate redundant key frames that comprise redundant information from the set of key frames. The remaining key frames can comprise the one or more key frames 126.

In an exemplary practical scenario, multi-dimensional query data 120 can comprise temporal model data such as a time sequence (e.g., a video) or spatial model data such as a 3D scan (e.g., scanned images from an MRI scanner). For example, multi-dimensional query data 120 can comprise a spatial 3D sequence of a human liver. Data access component 202 can access multi-dimensional query data 120 and FOI data 122 indicating focus areas within multi-dimensional query data 120. Data parsing component 208 can cut or parse the 3D sequence of the human liver into a sequence of 2D images, and AI component 204 can detect, based on the sequence of 2D images, specific key frames (e.g., slices) that indicate where the liver begins, where the liver ends, where the liver stops being visible, and so on, by employing FOI data 122. Recall that FOI data 122 can indicate where AI component 204 should look or focus within a dataset. As a result, the key frames detected by AI component 204 can comprise only the most useful information. On the contrary, without the FOI data 122 being provided to change detection model 110 and thereby AI component 204, it can be challenging to identify such key frames because the sequence of 2D images generated by data parsing component 208 can comprise multiple frames. For example, if multi-dimensional query data 120 comprises an ultrasound video, AI component 204 can identify key frames within the multi-dimensional query data 120, wherein the key frames can represent significant changes or changing scenes that can be very useful for downstream annotators or other models (e.g., AI models, machine learning models, etc.). In some embodiments, upon identification of the key frames by AI component 204, AI component 204 or a downstream AI or machine learning model can automatically annotate data comprised in the key frames.

Retrieving Similar Images from the Cloud:

In various embodiments, data access component 202 can also access cloud database 124, in addition to multi-dimensional query data 120 and FOI data 122 related to multi-dimensional query data 120. In one or more embodiments, AI component 204 can identify or retrieve from cloud database 124, based on FOI data 122, the set of similar images 128 comprising images that can be similar to multi-dimensional query data 120. For example, data parsing component 208 can parse multi-dimensional query data 120 into the sequence of 2D images 130 while maintaining a data sequence of multi-dimensional query data 120, and AI component 204 can identify the set of similar images 128 based on the sequence of 2D images 130 derived from multi-dimensional query data 120 by data parsing component 208. Identifying the set of similar images 128 based on FOI data 122 can reduce an amount of time spent by an entity (e.g., hardware, software, machine, AI, neural network and/or user), such as the entity providing FOI data 122, in inspecting large amounts of spatial or temporal data.

Cloud database 124 can be a data lake that can be of any size (e.g., large or small), and cloud database 124 can comprise a data collection that can have an order (e.g., temporal order, spatial order, etc.) or that can be unordered. Additionally, cloud database 124 can comprise local data (e.g., local to a hospital, clinic, etc.) or global data (e.g., from multiple hospitals, clinics, etc.). Cloud database 124 can comprise first images and embeddings of the first images with varying levels of similarity to multi-dimensional query data 120. In various embodiments, data generation component 212 can generate, based on the first images, a rank filtered database (e.g., rank filtered database 506 illustrated in FIG. 5) comprising second images having a first (or initial) level of similarity to the multi-dimensional query data 120.

In an embodiment, AI component 204 can detect differences between a first frame (i.e., a current frames) comprised in the rank filtered database and respective subsequent frames comprised in the rank filtered database to identify the set of similar images 128. For example, AI component 204 can retrieve from the rank filtered database, K number of images in an order, wherein K is a positive integer, and AI component 204 can detect differences between a first frame comprised in the K number of images and respective subsequent frames comprised in the K number of images to identify the set of similar images 128. For example, AI component 204 can adjust a similarity threshold based on a range of similarity values associated with respective combinations (or segments) of frames, wherein each combination of frames of the respective combinations of frames can comprise the first frame and a subsequent frame of the respective subsequent frames. Further, AI component 204 can detect based on a decrease in similarity between the first frame and the subsequent frame below the similarity threshold, the subsequent frame as a key frame for the specific combination of frames. AI component 204 can perform such a detection for each combination of frames comprising the first frame and a subsequent frame. Finally, AI component 204 can generate a set of key frames comprising respective key frames corresponding to the respective combinations of frames.

Alternatively, in another embodiment, AI component 204 can detect differences between a window comprised in the rank filtered database and respective subsequent frames comprised in the rank filtered database to identify the set of similar images 128, wherein a window can represent a number of neighboring elements (e.g., frames) based on a sorted similarity score from which a next level of difference (e.g., a next different frame) can be considered. For example, AI component 204 can adjust a similarity threshold based on a range of similarity values associated with respective combinations (or segments) of frames, wherein each combination of frames of the respective combinations of frames can comprise the window and a subsequent frame of the respective subsequent frames. Further, AI component 204 can detect based on a decrease in similarity between the window and the subsequent frame below the similarity threshold, the subsequent frame as a key frame for the specific combination of frames. AI component 204 can perform such a detection for each combination of frames comprising the window and a subsequent frame. Finally, AI component 204 can generate a set of key frames comprising respective key frames corresponding to the respective combinations of frames.

In various embodiments, highest similarity level component 210 can extract the set of similar images 128 from the set of key frames. For example, highest similarity level component 210 can employ a highest similarity level filter (e.g., highest similarity level filter 606 of FIG. 6) to filter the set of key frames and retain key frames having a defined level of similarity to multi-dimensional query data 120. In one or more embodiments, an entity (e.g., hardware, software, machine, AI, neural network and/or user) can provide feedback on/validate the set of key frames initially retrieved by AI component 204 from the rank filtered database, and based on the feedback, AI component 204 can iteratively update an order of the key frames retrieved from the rank filtered database. Thereafter, highest similarity level component 210 can employ the highest similarity level filter to retrieve the set of similar images 128 comprising images that are most similar to multi-dimensional query data 120.

In various embodiments, data generation component 212 can generate the rank filtered database comprising images having a first level of similarity between image embeddings of a query image from the sequence of 2D images 130 and image embeddings of images comprised in cloud database 124. For example, during iteration zero (0) of the DIR process to retrieve the set of similar images 128 from cloud database 124, data generation component 212 can calculate a rank size, wherein the rank size can indicate the number of similar images from cloud database 124 that can represent a rank of the rank filtered database, and data generation component 212 can further calculate the rank. Data generation component 212 can employ the rank size to generate the rank filtered database.

As a practical application, multi-dimensional query data 120 can comprise temporal model data such as a time sequence (e.g., a video) or spatial model data such as a 3D scan (e.g., scanned images from a magnetic resonance imaging (MRI) scanner). For example, multi-dimensional query data 120 can comprise a spatial 3D sequence of a human liver. Data access component 202 can access multi-dimensional query data 120, FOI data 122 corresponding to multi-dimensional query data 120 and cloud database 124 (e.g., a cloud service). Data parsing component 208 can cut or parse the 3D sequence of the human liver into a sequence of 2D images, and AI component 204 can retrieve from cloud database 124 images similar to the sequence of 2D images, by employing FOI data 122. In some embodiments, AI component 204 or another entity (e.g., hardware, software, machine, AI, neural network and/or user) can iteratively update FOI data 122, based on the images retrieved by AI component 204 over various iterations, such that AI component 204 can continue to retrieve the most appropriate and similar images from cloud database 124 with a higher level of similarity to multi-dimensional query data 120.

In various embodiments, the similarity threshold or similarity score (e.g., similarity score 502 of FIG. 5) employed by AI component 204 to identify/detect the one or more key frames 126 in multi-dimensional query data 120 or identify/retrieve the set of similar images 128 from cloud database 124 can be a similarity value representing a boundary with respect to which AI component 204 can determine whether a frame can be considered a key frame. For example, in various embodiments, the similarity threshold can indicate a degree of similarity between embeddings of the first frame and embeddings of a subsequent frame in a combination of frames, such that the similarity threshold is equal to or greater than a defined value, AI component 204 can detect the subsequent frame as a key frame.

In summary, non-limiting system 100 can bootstrap information within a query dataset rather than randomly selecting images in a sequence as key frames. The methods and techniques employed by non-limiting system 100 in the process can be quick and efficient and can be employed in high scales for multiple use cases, without being limited to healthcare. In one or more embodiments, AI component 204 can be a domain specific foundation model that can be trained prior to being deployed in change detection model 110, and based on the training, AI component 204 can generate effective embeddings representations of the query dataset. If integrated within a convenient GUI, change detection model 110 can be an efficient tool for expert annotators to easily filter and select designated key frames to annotate, and change detection model 110 can be employed by the expert annotators to retrieve similar images from large unlabeled data lakes while annotating a new class of data.

Figure 4:
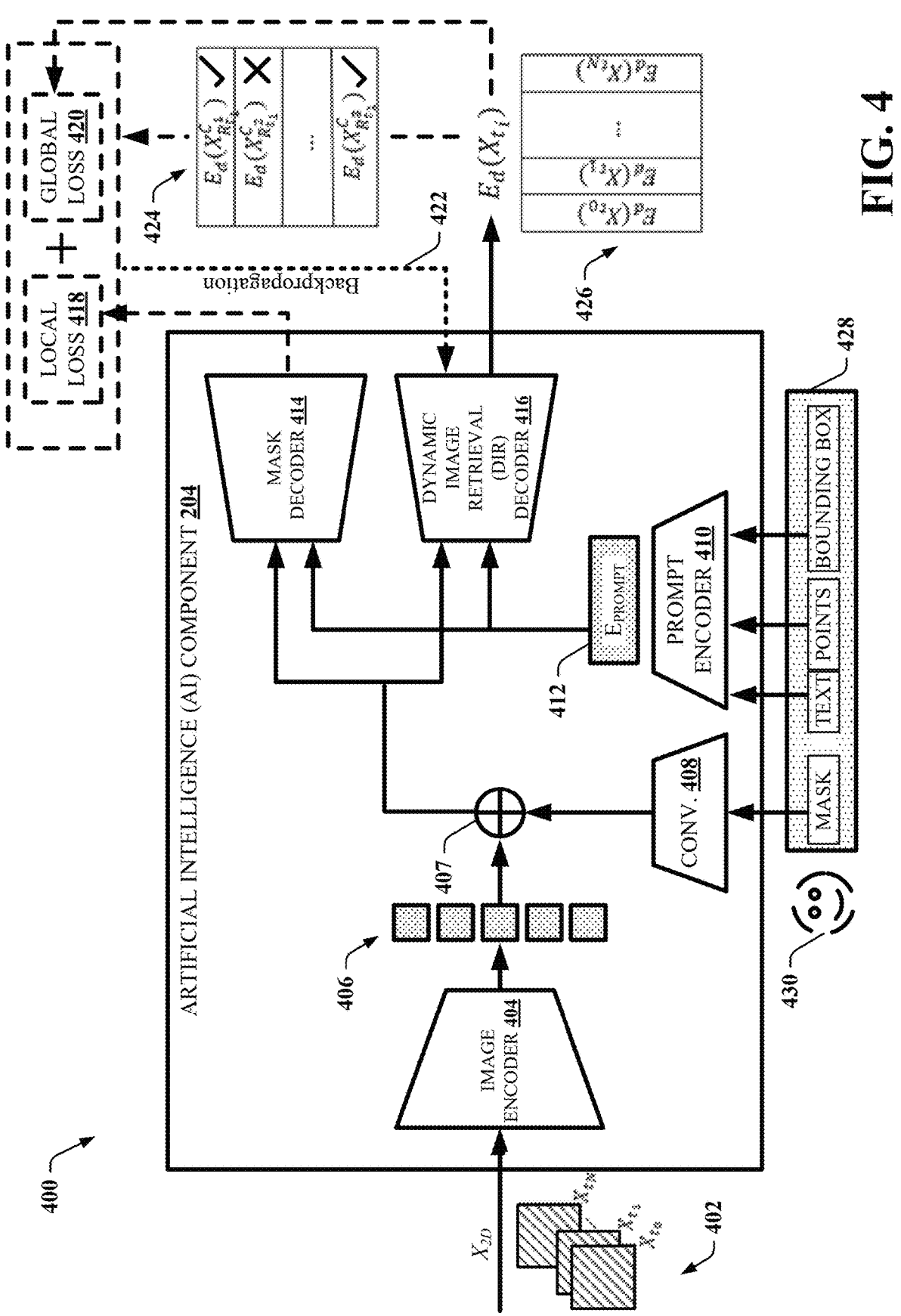
FIG. 4 illustrates a block diagram of an example, non-limiting architecture of an AI component that can employ dynamic information retrieval and foundation models to identify key frames in a data sequence or video or retrieve images from a cloud database, in accordance with one or more embodiments described herein.
Figure 5:
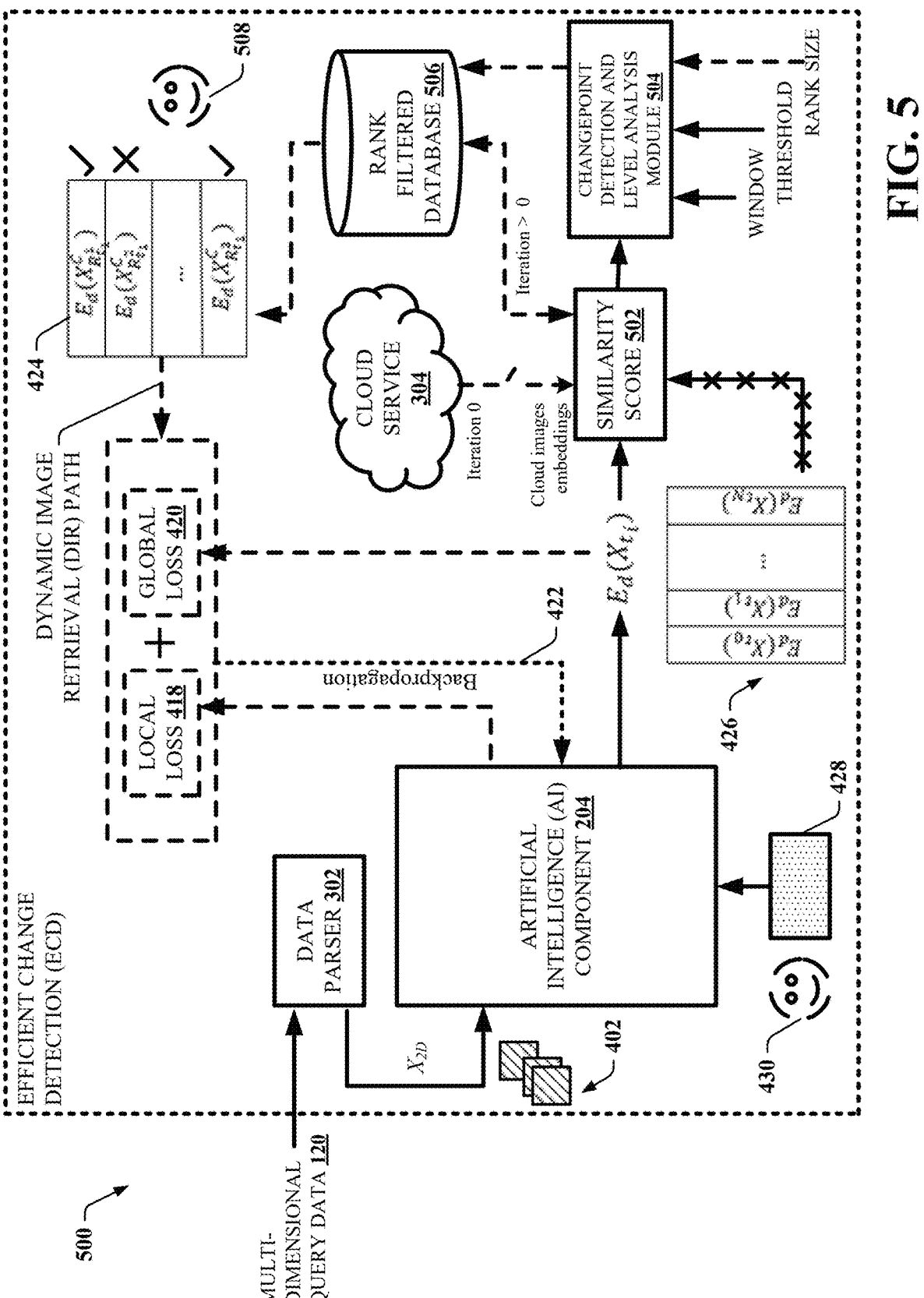
FIGS. 5 and 6 illustrate diagrams of an example, non-limiting method that can employ the architecture of the AI component illustrated in FIG. 4 to efficiently detect change in data, in accordance with one or more embodiments described herein.
Figure 6:
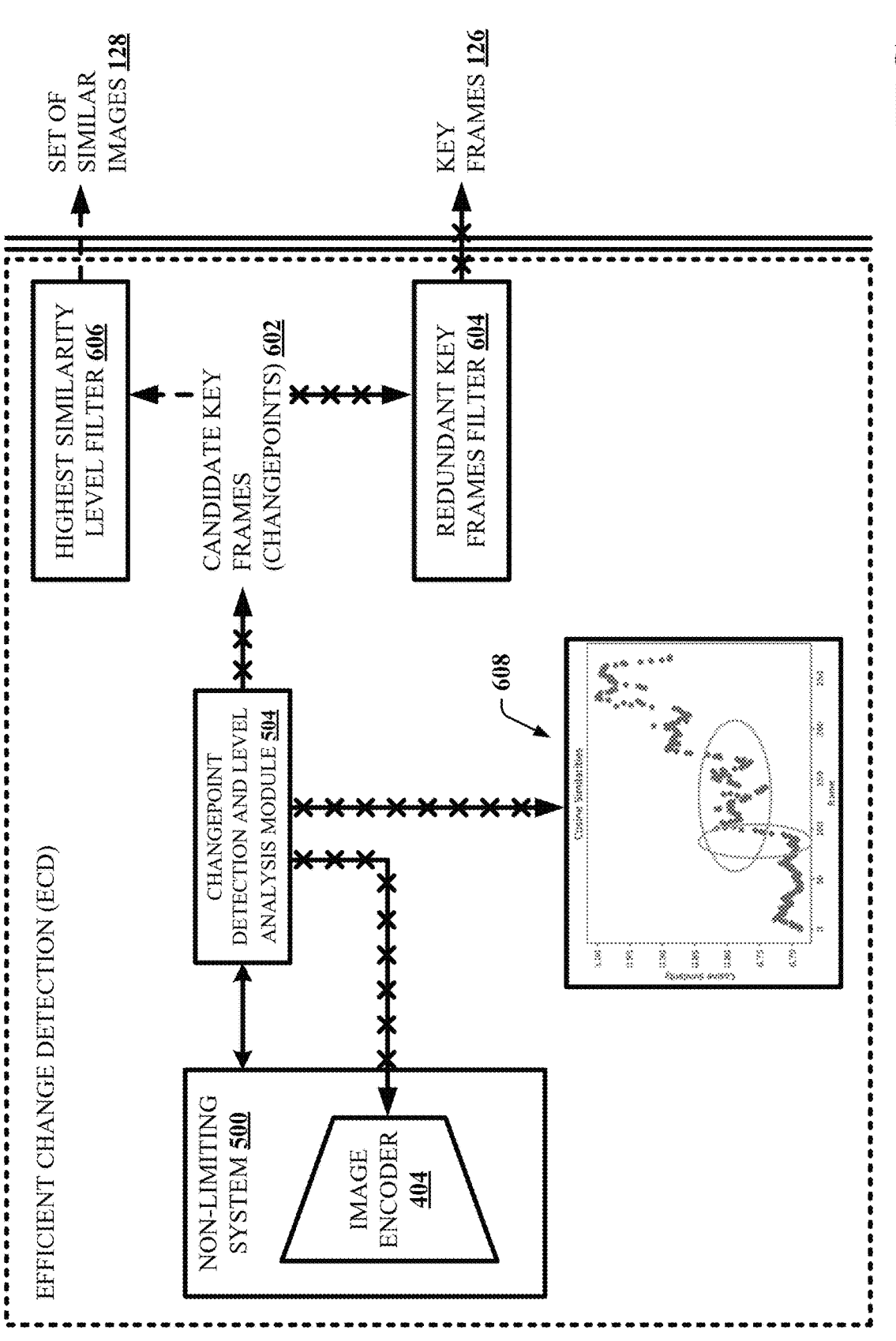

FIGS. 4-6 describe the architecture and functionalities of AI component 204 in greater detail to elaborate on the various embodiments discussed in this specification.

FIG. 2 illustrates another block diagram of an example, non-limiting system 200 that can employ dynamic information retrieval and foundation models to identify key frames in a data sequence or video or retrieve images from a cloud database, in accordance with one or more embodiments described herein. Repetitive description of like elements and/or processes employed in respective embodiments is omitted for sake of brevity.

Non-limiting system 200 illustrates the system of change detection model 110 comprising data access component 202, AI component 204, redundant key frames component 206, data parsing component 208, highest similarity level component 210 and data generation component 212. As described with reference to FIG. 1, AI component 204 can be an algorithm that can compare the similarity between a starting frame (i.e., a first frame/current frame or a window) and subsequent frames in a sequence of data comprised in either multi-dimensional query data 120 (e.g., a local query dataset) or a rank filtered database comprising data from cloud database 124. Thereafter, AI component 204 can dynamically adjust a similarity threshold based on the range of similarity values within each combination (or segment) of frames comprising the starting frame and a subsequent frame. The combinations of frames to be considered in this process can be determined by AI component 204 beginning at a current/starting frame and moving towards the last frame in the sequence of 2D images 130. Upon detecting a significant drop in similarity below the similarity threshold for a frame, AI component 204 can mark that frame as a potential key frame (also known as changepoint or change detection candidate frame). A set of key frames can thus be identified by evaluating each combination of frames.

In an embodiment, level analysis can be utilized by redundant key frames component 206, wherein redundant key frames component 206 can employ a redundant key frames filter to filter out frames that are too similar to others to retain only the most information key frames. This process can ensure that the one or more key frames 126 comprise only key frames with unique similarity levels to images comprised in the sequence of 2D images derived from multi-dimensional query data 120. In another embodiment, highest similarity level component 210 can employ a highest similarity level filter to filter the set of key frames and retain key frames having a defined level of similarity to multi-dimensional query data 120. This process can ensure that the set of similar images 128 comprises only those images from cloud database 124 that have the highest similarity (e.g., a defined level of similarity) to multi-dimensional query data 120. In either scenario, the key frames comprised in the one or more key frames 126 or the set of similar images 128 can represent significant transitions or changes in a data sequence comprised in multi-dimensional query data 120, and the key frames can be employed for downstream applications such as annotation, information retrieval, etc. In some embodiments, other methods for changepoint detection and level analysis as well as image retrieval can be employed.

Figure 3:
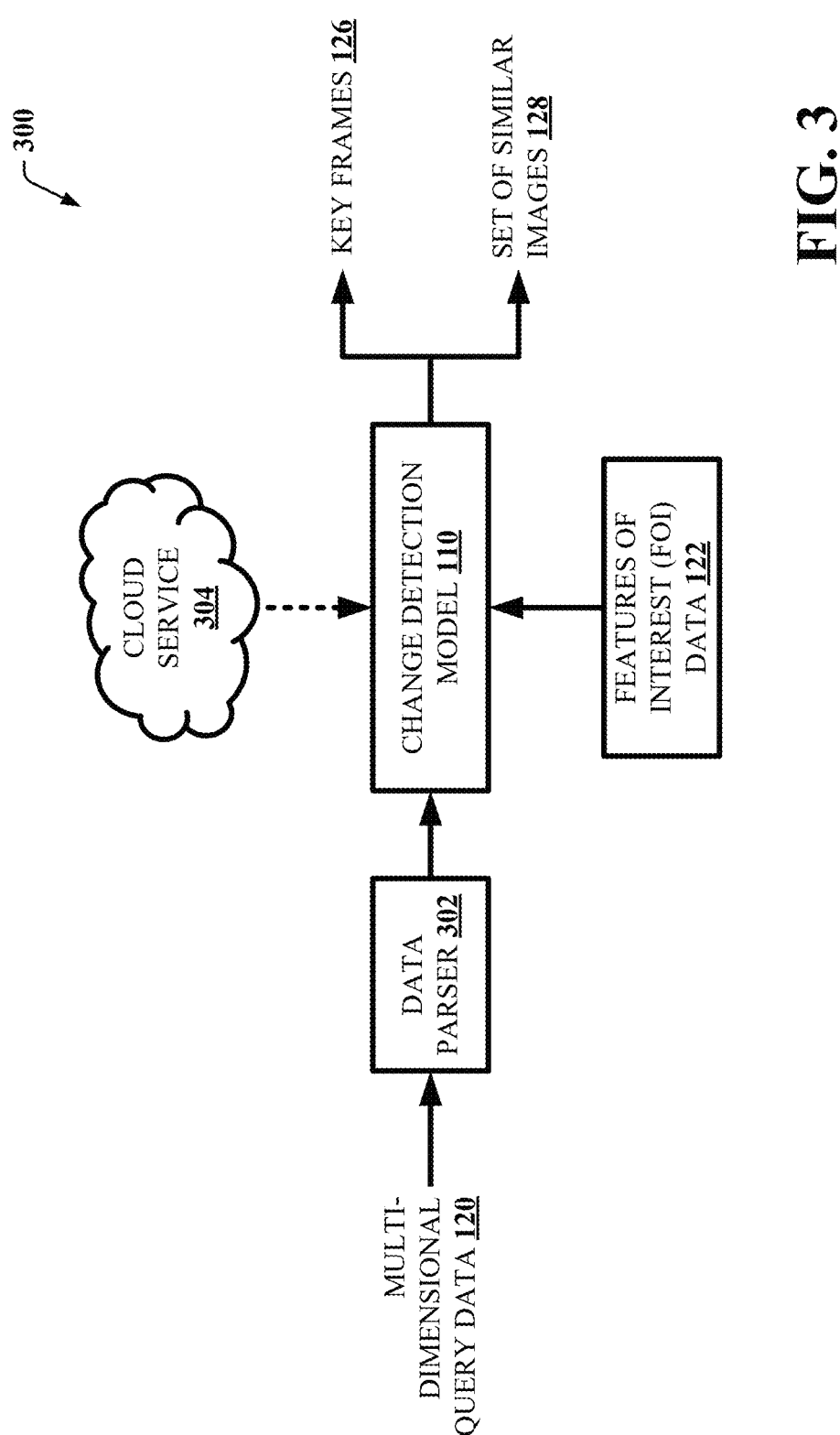
FIG. 3 illustrates a flow diagram of an example, non-limiting method that can employ dynamic information retrieval and foundation models to identify key frames in a data sequence or video or retrieve images from a cloud database, in accordance with one or more embodiments described herein.

FIG. 3 illustrates a flow diagram of an example, non-limiting method 300 that can employ dynamic information retrieval and foundation models to identify key frames in a data sequence or video or retrieve images from a cloud database, in accordance with one or more embodiments described herein. Repetitive description of like elements and/or processes employed in respective embodiments is omitted for sake of brevity.

At a high-level, non-limiting method 300 illustrates an overview of the methods and techniques employed by change detection model 110 of FIGS. 1 and 2 for efficient change detection (ECD) to detect key frames in a data sequence by employing dynamic information retrieval and foundation models. In an embodiment, multi-dimensional query data 120 can comprise medical query data, wherein the medical query data can be a temporal dataset comprising a 2D, 3D or 4D sequence of images. Change detection model 110 can access multi-dimensional query data 120 and FOI data 122 comprising global and/or local FOL. The local FOI data can comprise text data, mask data, points or bounding boxes prompted by an entity (e.g., hardware, software, machine, AI, neural network and/or user), whereas the global FOI data can comprise images marked by the entity as positive or negative, in terms of similarities of images retrieved from cloud service 304 to a query image generated by data parser 302 (e.g., a 2D query image). Change detection model 110 can also access cloud service 304, wherein cloud service 304 can be analogous to cloud database 124. For example, cloud service 304 can comprise a very large database of images and embeddings of the images with various levels of similarity to the query image.

Data parser 302 can be analogous to data parsing component 208. As such, data parser 302 can access as input data, the 2D, 3D or 4D sequence of images comprised in multi-dimensional query data 120 and parse the input data to generate a sequence of 2D query images, while maintaining an order of the original dataset. That is because change detection model 110 can be an algorithm that can process 2D query images. Based on the 2D query images, change detection model 110 can detect the one or more key frames 126 (e.g., a sequence of 2D, 3D or 4D key frames) within multi-dimensional query data 120 or change detection model can retrieve the set of similar images 128 from cloud service 304. By employing cloud service 304, change detection model can effectively retrieve, based on inputs provided by an entity (e.g., hardware, software, machine, AI, neural network and/or user) via the global and/or local FOI data, image embeddings of the query image and image embeddings of images stored by cloud service 304 to retrieve the set of similar images 128.

Change detection model 110 can automatically identify the one or more key frames 126 or the set of similar images 128, thereby enhancing the efficiency of such tasks that are typically performed manually and are time consuming. This can further reduce the time involved in the R&D stages of developing AI models, thereby reducing the costs involved in the process.

FIG. 4 illustrates a block diagram of an example, non-limiting architecture 400 of an AI component that can employ dynamic information retrieval and foundation models to identify key frames in a data sequence or video or retrieve images from a cloud database, in accordance with one or more embodiments described herein. Repetitive description of like elements and/or processes employed in respective embodiments is omitted for sake of brevity.

It should be appreciated that in FIGS. 4-6, not including the backpropagation line and the efficient change detection (ECD) box, the dashed lines correspond to the method employed by AI component 204 (FIGS. 1 and 2) to retrieve images similar to the query image $X_{2D}$ from cloud database 124 (i.e., the set of similar images 128), whereas the solid lines and solid lines with the 'X' symbols correspond to the method employed by AI component 204 to identify key frames within multi-dimensional query data 120 (i.e., the one or more key frames 126).

The efficient change detection method performed by change detection model 110 illustrated in FIGS. 1 and 2 can involve multiple modules, with the AI component 204 being the heart of the method. As such, in various embodiments, AI component 204 can be a change detection foundation model or change detection-based foundation model having an architecture based on known vision foundation models such as Segment Anything Model (SAM). In general, foundation models are AI models trained on large amounts of data to perform a variety of tasks.

Non-limiting architecture 400 describes the architecture of AI component 204. As illustrated, AI component 204 can comprise image encoder 404, prompt encoder 410, mask decoder 414 and dynamic image retrieval (DIR) decoder 416. AI component 204 can take as input, one or more 2D query images (i.e., sequence of 2D images 130) generated by data parsing component 208. For example, as illustrated at 402, the query image $X_{2D}$ can be an input to image encoder 404, and the query image $X_{2D}$ can be a part of N frames sorted in an ordered sequence $X_t$ (where $0<i<N$). Image encoder 404 can be, for example, a medical image encoder pre-trained on very large amounts of various medical data, yielding strong representational knowledge to an image embedding vector. Image encoder 404 can generate query image embeddings 406 based on the query image $X_{2D}$.

Block 428 illustrates local FOI data (e.g., FOI data 122) that can be applied on the query image $X_{2D}$. The local FOI data can comprise mask data, text data, points or a bounding box, and the local FOI data can be provided to change detection model 110 by an entity (e.g., hardware, software, machine, AI, neural network or user). For example, the local FOI data can be accessed by data access component 202 as a user-provided prompt.

Prompt encoder 410 can generate two types of prompts (similar to a SAM) based on the local FOI data. A first type of prompt generated by prompt encoder 410 can be a sparse prompt for text data, points and bounding boxes, wherein free-form text data can be represented by employing an off-the-shelf text encoder from Contrastive Language Image Pretraining (CLIP), and wherein points and bounding boxes can be represented by positional encodings summed with learned embeddings from each type of prompt. $E_{prompt}$ at 412 can represent embeddings generated by prompt encoder 410 based on the local FOI data. A second type of prompt generated by prompt encoder 410 can be a dense prompt for mask data or masks, wherein the mask data can be embedded by employing convolutions (conv. 408) and can be summed elementwise with query image embeddings 406, as illustrated at 407.

Mask decoder 414 can be a local decoder. Further, mask decoder 414 can be a frozen (SAM-like) decoder that can output the local FOI according to a prompt provided by the entity (e.g., hardware, software, machine, AI, neural network or user). Thus, in various embodiments, mask decoder 414 can assist AI component 204 in detecting local FOI in the query image $X_{2D}$, based on the prompts generated by prompt encoder 410 and query image embeddings 406. DIR decoder 416 can be a global decoder. Further, DIR decoder 416 can be a simple, lightweight linear layer of neural network that can be initialized by AI component 204 as an identity matrix.

Global loss 420 represents a contrastive loss that can be employed by AI component 204 to dynamically learn the similarities between embeddings (or embeddings similarity) of different images in an iterative manner. Global loss 420 can be based on the global FOI data (e.g., FOI data 122) provided to AI component 204 by an entity (e.g., hardware, software, machine, AI, neural network and/or user) as global reinforcement. In FIG. 4, block 424 illustrates global reinforcement, wherein $$E_d\left(X^C_{R^2_{t_1}}\right)$$

represents a reinforcement score (negative (−) 1 or 1) that can be comprised in the global FOI data and that can be later employed by AI component 204 in a global loss calculation. Herein, global refers to data at the frame level. For example, AI component 204 can employ global loss 420 to determine whether an image comprised in cloud database 124 is of desirable quality, similar to the query image $X_{2D}$, on the X-axis or the Z-axis, and so on.

Local loss 418 represents spatial loss that can learn local FOI data (i.e., the prompted FOI) and assist DIR decoder 416 in learning to identify areas on the query image $X_{2D}$ wherein DIR decoder 416 should focus. Local loss 418 corresponds to the local FOI data provided to AI component 204 by an entity (e.g., hardware, software, machine, AI, neural network and/or user) as local reinforcement so that AI component 204 can detect FOI within the query image $X_{2D}$. In FIG. 4, local reinforcement is represented by the symbol at 430. In embodiments wherein AI component 204 can be employed to retrieve images similar to the query image $X_{2D}$ from cloud database 124, local loss 418 can be computed by AI component 204 according to the query image $X_{2D}$ and images comprised in the cloud database 124.

In one or more embodiments, DIR decoder 416 can be updated or retrained by AI component 204 via backpropagation, as illustrated at 422, based on a weighted loss comprised of a weighted global loss (e.g., global loss 420) and a weighted local loss (e.g., local loss 418). In one or more embodiments, DIR decoder 416 can be dynamically updated by AI component 204 in a manner that ranks the output image embeddings $E_d(X_{t_i})$ (where 0<i<N) illustrated at 426 according to their similarity to the query image $X_{2D}$.

Turning next to FIGS. 5 and 6, illustrated is an example, non-limiting method 500 that can employ the architecture of the AI component illustrated in FIG. 4 to efficiently detect change in data, in accordance with one or more embodiments described herein. Repetitive description of like elements and/or processes employed in respective embodiments is omitted for sake of brevity.

With continued reference to FIGS. 1-4, non-limiting method 500 illustrates how the architecture of AI component 204 can be employed to identify key frames in multi-dimensional query data 120 or retrieve images from cloud database 124. FIG. 6 illustrates a continuation of non-limiting method 500 from FIG. 5.

Recall that during the process of detecting the one or more key frames 126 from cloud database 124, AI component 204 can detect differences between a first frame (i.e., a current frame) or a window comprised in the sequence of 2D images 130 derived from multi-dimensional query data 120 and respective subsequent frames comprised in the sequence of 2D images 130. Similarly, during the process of retrieving the set of similar images 128, AI component 204 can detect differences between a first frame or a window comprised in rank filtered database 506 and respective subsequent frames comprised in rank filtered database 506. In either embodiment, AI component 204 can adjust a similarity threshold based on a range of similarity values associated with respective combinations of frames, wherein each combination of frames of the respective combinations of frames comprises the first frame and a subsequent frame or the window and the subsequent frame. In this regard, the output image embeddings $E_d(X_{t_i})$ illustrated at 426 can represent the embeddings of the first frame (e.g., the query image $X_{2D}$) and the subsequent frames, and the output embeddings can be generated by DIR decoder 416. Further, the similarity threshold can refer to a similarity value that represents a boundary with respect to which a frame can be considered a key frame. In FIG. 5, the similarity threshold is illustrated as similarity score 502.

In various embodiments, data generation component 212 can generate rank filtered database 506 comprising images from cloud service 304 that have a first level of similarity to the query image $X_{2D}$. Recall that during iteration zero (0) of the DIR process to retrieve the set of similar images 128 from cloud database 124, data generation component 212 can calculate a rank size, wherein the rank size can indicate the number of similar images from cloud database 124 that can represent a rank of rank filtered database 506, and data generation component 212 can further calculate the rank. Data generation component 212 can employ the rank size to generate rank filtered database 506.

In various embodiments, data generation component 212 can also calculate similarity score 502, wherein similarity score 502 can represent a degree of similarity between the embeddings of a query image (e.g., an image from the sequence of 2D images 130 or from cloud database 124) and embeddings of an image from a dataset (e.g., other images comprised in the sequence of 2D images or cloud database 124). For example, the query image can be the first frame (i.e., current frame) comprised in the sequence of 2D images, and data generation component 212 can calculate similarity score 502 based on the similarity between query image embeddings 406 and embeddings of a subsequent image comprised in the sequence of 2D images 130. In a different example, the query image can be a first image comprised in K number of images initially retrieved from rank filtered database 506, and data generation component 212 can calculate similarity score 502 based on a difference between embeddings of the query image and embeddings of a subsequent image comprised in the rank filtered database 506. In various embodiments, data generation component 212 can employ an AI similarity metric to calculate the similarity score 502. In some embodiments, cosine similarity, a common method for such tasks, can be employed as the similarity threshold, whereas in other embodiments, other similarity scores such as Euclidean distance, Manhattan distance, Jaccard similarity, etc. can be employed as the similarity threshold.

In one or more embodiments, AI component 204 can employ changepoint detection and level analysis module 504 to detect the one or more key frames 126. Changepoint detection and level analysis module 504 can be a module that can be implemented in various methods with algorithms ranging from multiple domains such as fintech, timeseries analysis, etc. The inputs to changepoint detection and level analysis module 504 can comprise a window, the similarity threshold employed by AI component 204 and the rank size calculated by data generation component 212. As stated elsewhere herein, a window can represent the number of neighboring elements (e.g., frames) based on a sorted similarity score from which a next level of difference in data can be considered. To detect the one or more key frames 126, changepoint detection and level analysis module 504 can adjust the similarity threshold (i.e., similarity score 502) based on a range of similarity values associated with each combination of frames comprising the first frame and a subsequent frame, or comprising a window and the subsequent frame. Further, changepoint detection and level analysis module 504 can employ the first frame or the window and the similarity threshold to detect, based on a decrease in similarity between the first frame/window and the subsequent frame below the similarity threshold, the subsequent frame as a key frame. Changepoint detection and level analysis module 504 can perform such an evaluation for each combination of the first frame/window and a subsequent frame, thereby generating a set of key frames (e.g., candidate key frames (changepoints) 602 in FIG. 6). Thereafter, redundant key frames component 206 can employ redundant key frames filter 604 to the set of key frames to discard redundant key frames, and the remaining key frames can be the one or more key frames 126.

Similarly, in one or more embodiments, AI component 204 can employ changepoint detection and level analysis module 504 to retrieve the set of similar images 128 from rank filtered database 506 via a DIR path based on global reinforcement. In FIG. 5 global reinforcement is illustrated at 424 and further by the symbol at 508. To retrieve the set of similar images 128, changepoint detection and level analysis module 504 can adjust (i.e., similarity score 502) the similarity threshold based on a range of similarity values associated with each combination of frames comprising the first frame and a subsequent frame, or comprising a window and the subsequent frame. Further, changepoint detection and level analysis module 504 can employ the rank size to detect, based on a decrease in similarity between the first frame/window and the subsequent frame below the similarity threshold, the subsequent frame as a key frame. Changepoint detection and level analysis module 504 can perform such an evaluation for each combination of the first frame/window and a subsequent frame, thereby generating a set of key frames (e.g., candidate key frames (changepoints) 602 in FIG. 6). Thereafter, highest similarity level component 210 can employ highest similarity level filter 606 to the set of key frames to retain only the key frames having a defined level of similarity to the query image $X_{2D}$. The retained key frames can be the set of similar images 128.

Figure 7:
FIG. 7 illustrates a diagram of an example, non-limiting graph of cosine similarities, in accordance with one or more embodiments described herein.

In one or more embodiments, changepoint detection and level analysis module 504 can generate feedback to image encoder 404 to update and retrain image encoder 404 to generate more accurate embeddings. In one or more embodiments, changepoint detection and level analysis module 504 can also generate graphs such as non-limiting graph 608. Non-limiting graph 608 is a graph of cosine similarity versus frames that is typically representative of similarity between data features such as images across consecutive frames or data points. Such a graph can be output/displayed by change detection and level analysis module 504 at a GUI of a device (e.g., desktop computer, laptop computer, etc.) to an entity (e.g., hardware, software, machine, AI, neural network and/or user) to show, for example, similarities between key frames. A zoomed-in version of non-limiting graph 608 is illustrated in FIG. 7.

Thus, AI component 204 can effectively detect changes in medical imaging sequences of various types (e.g., 2D, 3D or 4D data sequences) and produce high-quality key frame selections based on FOI data with improved variance by employing bootstrapped local data or global data-based similarity scores. The key frames can be employable across various domains for annotations by SMEs or other entities (e.g., hardware, software, machine, AI, neural network and/or user) and for other downstream tasks. In various embodiments, the identification of clusters of different high-quality key frames (e.g., scenes) based on local or global FOI data can simplify the process of key frame selection, for example, by SMEs, and can provide for efficient detection of specific scenes or images in various types of ordered sequences. By utilizing similarity score 502 based on image embeddings alongside time series algorithms, AI component 204 can provide a robust method of key frame selection across multiple modalities, wherein such a method can outperform specific random scene selections. Additionally, in one or more embodiments, feedback from an SME can be incorporated during retrieval of the set of similar images 128 from rank filtered database 506, and the human-in-the-loop approach can result in a highly effective image retrieval method from both local as well as global cloud databases.

Figure 8:
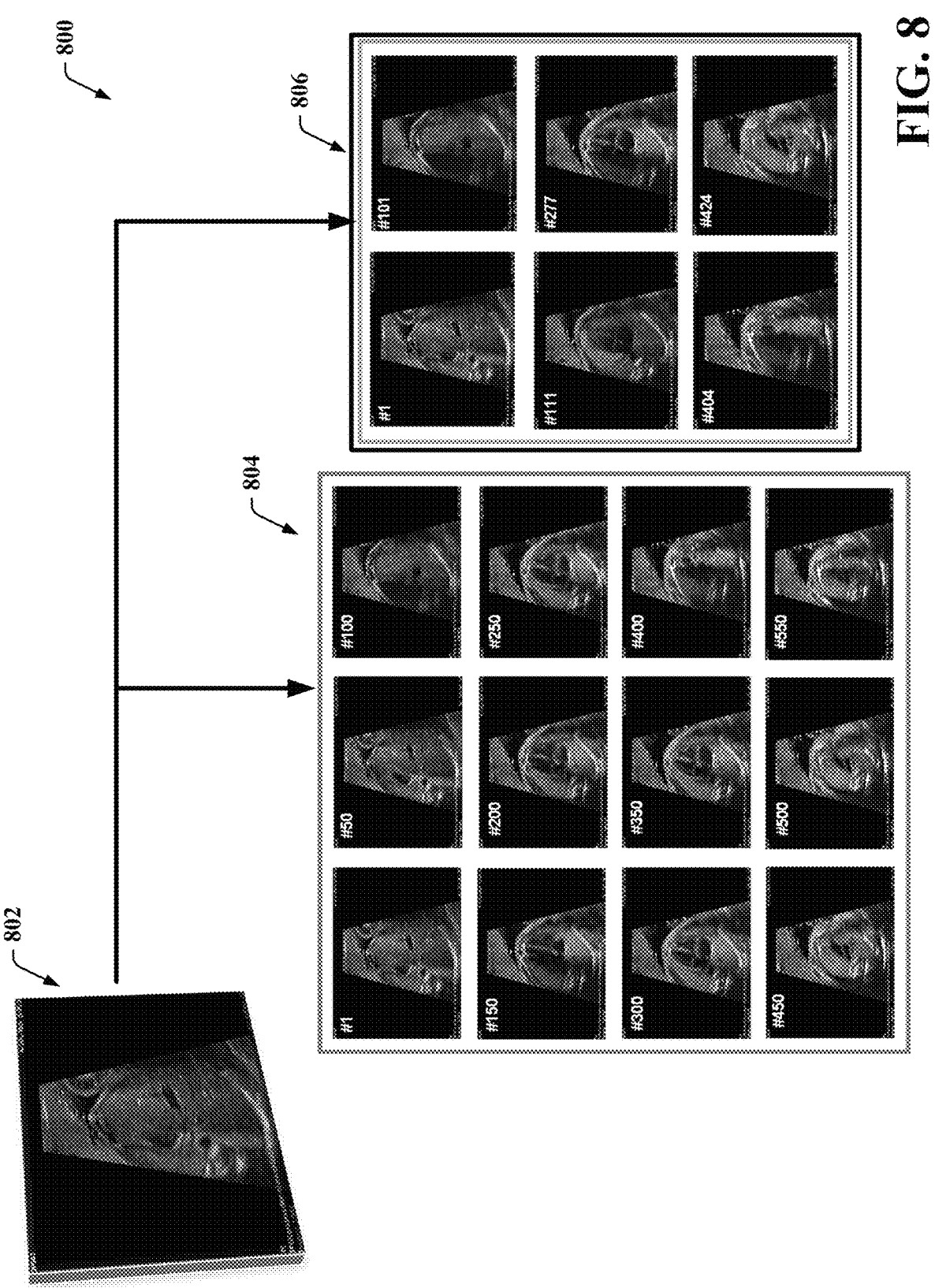
FIG. 8 illustrates a diagram of an example, non-limiting scenario wherein key frames can be detected in medical image data, in accordance with one or more embodiments described herein.
Figure 9:
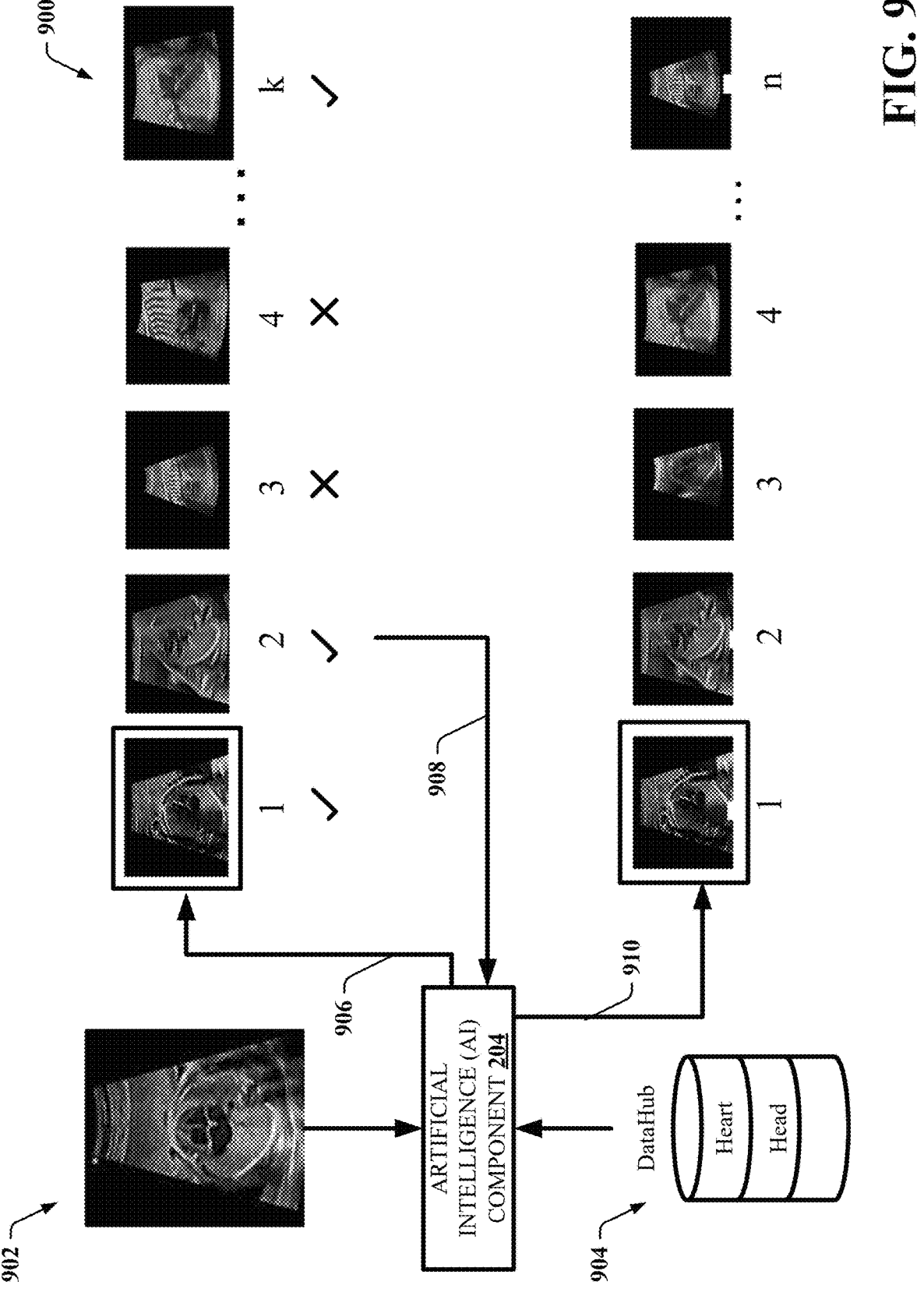
FIG. 9 illustrates a flow diagram of an example, non-limiting method wherein medical images can be retrieved from the cloud, in accordance with one or more embodiments described herein.

FIGS. 8 and 9 show proofs of concept of the organized change detection described in various embodiments of the present disclosure. In FIGS. 8 and 9, experimental results generated by employing change detection model 110 (FIGS. 1 and 2) for key frames detection applications based on ultrasound data sequences are shown. These experimental results were also validated by an SME. FIG. 9 illustrates experimental results for DIR based on global FOI data, wherein the DIR was tested on fetal images, showing promising results for future applications. The change detection model 110 can also be developed and fine-tuned further to enhance the experimental results.

FIG. 8 illustrates a diagram of an example, non-limiting scenario 800 wherein key frames can be detected in medical image data, in accordance with one or more embodiments described herein. Repetitive description of like elements and/or processes employed in respective embodiments is omitted for sake of brevity.

Non-limiting scenario 800 illustrates an experimental real-life example. Pictured at 802 is a multi-dimensional sequence of fetal ultrasound data. The sequence shown at 804 is an example of a 2D sequence of key frames generated via random selection, wherein each key frame was selected every 50 frames from the sequence of ultrasound data. The sequence shown at 806 is an example of a 2D sequence of key frames generated by change detection model 110 (FIGS. 1 and 2) based on the ultrasound data. Evidently, the data shown at 806 shows a more effective key frame selection and better data variability than the data shown at 804. That is, the data shown at 806 comprises meaningful differences between images. Such differences can be useful for downstream tasks such as annotations. Change detection model 110 can generate a better key frame selection than that generated by random selection.

FIG. 9 illustrates a flow diagram of an example, non-limiting method 900 wherein medical images can be retrieved from the cloud, in accordance with one or more embodiments described herein. Repetitive description of like elements and/or processes employed in respective embodiments is omitted for sake of brevity.

Non-limiting method 900 illustrates an exemplary scenario wherein change detection model 110 (FIGS. 1 and 2) can be employed to dynamically retrieve the set of similar images 128 from cloud database 124 based on multi-dimensional query data 120. Non-limiting method 900 further illustrates the iterations that can be involved in DIR.

Query image 902 shows a fetal ultrasound image, and data hub 904 can be a data lake comprised in cloud database 124. Data hub 904 can comprise images similar to query image 902, wherein different images can have different levels of similarity to query image 902. At 906 (e.g., step 1), AI component 204 can retrieve K first retrieved images from rank filtered database 506. These images can be presented to an entity (e.g., hardware, software, machine, AI, neural network and/or user) at the GUI of a device (e.g., desktop computer, laptop computer, tablet, etc.), and the entity can provide feedback on the K first retrieved images. For example, an annotator can provide human feedback on the K first retrieved images. At 908 (e.g., step 2), the K first retrieved images with the feedback can be accessed by AI component 204, and at 910 (e.g., step 3), AI component 204 can generate updated N first ordered retrieved images.

More specifically, during the first iteration (at 906), AI component 204 can employ global reinforcement based on the global FOI data (e.g., FOI data 122) to retrieve images from cloud database 124 that are similar to query image 902. Thereafter, during a second iteration, DIR decoder 416 can be updated, based on the retrieved images, by AI component 204 via backpropagation. DIR decoder 416 can be a simple neural network that can transform data from a dimension to the same dimension, update a rank associated with rank filtered database 506, and based on the rank, iteratively update the ranking of rank filtered database 506 until images that are most similar to query image 902 are generated.

Thus, the DIR process can be an iterative process wherein at iteration zero (0), data generation component 212 can generate rank filtered database 506, and wherein at iterations >0, AI component 204 can dynamically update the images retrieved from rank filtered database 506 until images having a desirable level of similarity to query image 902 are retrieved. The images thus retrieved can be further filtered by highest similarity level component 210 to retain only the images having a defined level of similarity to the query image 902.

Figure 10:
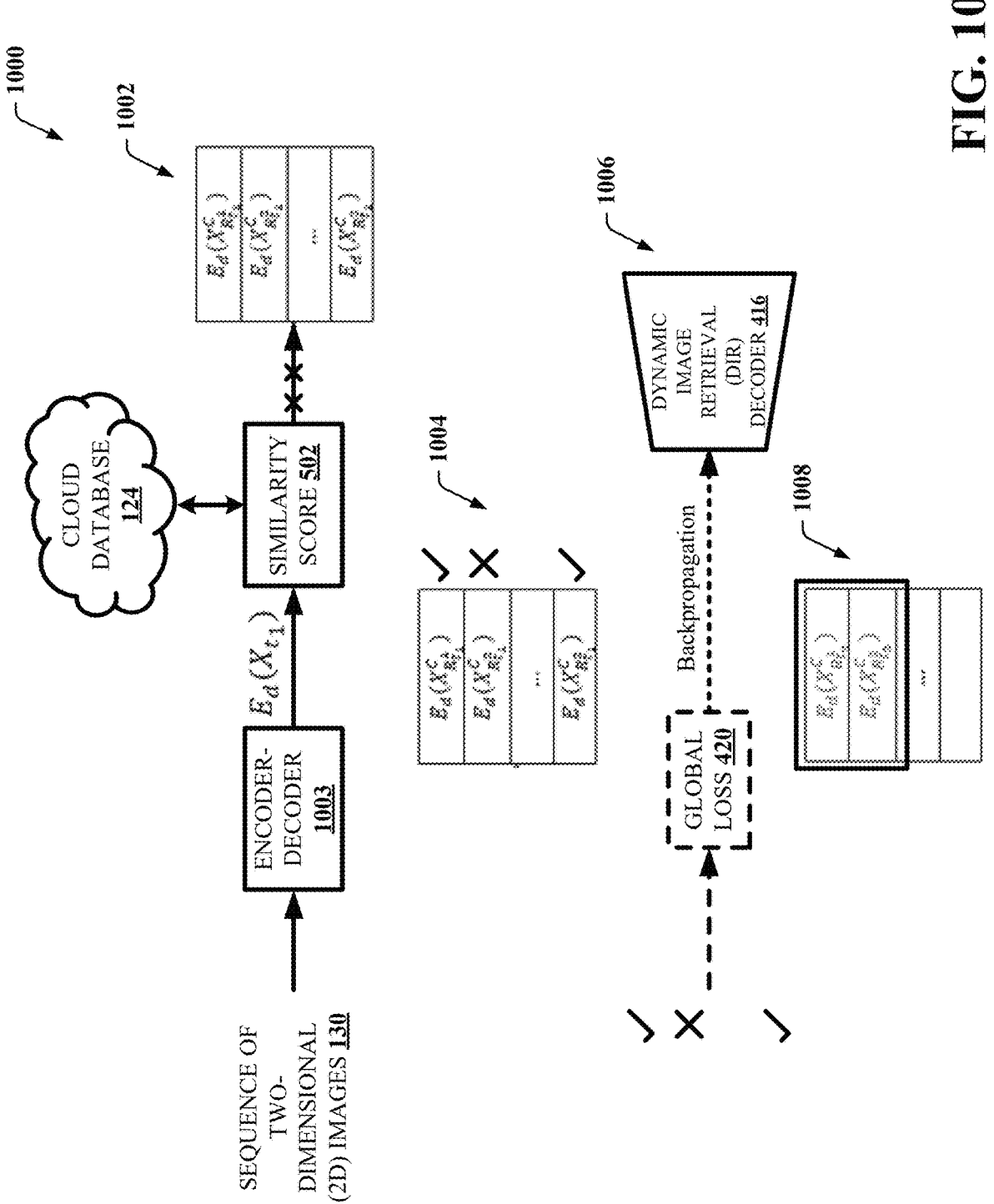
FIG. 10 illustrates another flow diagram of an example, non-limiting method wherein medical images can be retrieved from the cloud, in accordance with one or more embodiments described herein.

FIG. 10 illustrates a flow diagram of an example, non-limiting method 1000 wherein medical images can be retrieved from the cloud, in accordance with one or more embodiments described herein. Repetitive description of like elements and/or processes employed in respective embodiments is omitted for sake of brevity.

With continued reference to at least FIGS. 1, 2 and 9, non-limiting method 1000 illustrates, via steps 1002, 1004, 1006 and 1008, additional embodiments surrounding the iterative aspect of the DIR process executed by AI component 204. At 1002, a 2D query image/initial query can be processed by AI component 204 (via encoder-decoder 1003 representing non-limiting architecture 400 of AI component 204) and K most similar images from cloud database 124 can be retrieved in an order/sequence. At 1004, an entity (e.g., hardware, software, machine, AI, neural network and/or user) can provide, via global FOI data, positive or negative feedback to k (e.g., a small portion) of images from the retrieved images. At 1006, the algorithm of AI component 204 can propagate, based on the feedback, a gradient loss to DIR decoder 416 to learn preferences of the entity. At 1006, AI component 204 can update DIR decoder 416 via backpropagation, and DIR decoder 416 can reorder the N images according to the learnt similarity. In various embodiments, steps 1004 and 1006 can repeat M times until images having a desired level of similarity to the 2D query image have been retrieved from cloud database 124. Thereafter, the images can be further filtered by highest similarity level component 210, as discussed in one or more embodiments.

FIG. 11 illustrates flow diagrams of example, non-limiting methods 1100 that can employ a foundation model to detect key frames in multi-dimensional query data, in accordance with one or more embodiments described herein. Repetitive description of like elements and/or processes employed in respective embodiments is omitted for sake of brevity.

At 1102, non-limiting method 1100 can comprise accessing (e.g., by data access component 202), by a system operatively coupled to a processor, multi-dimensional query data and FOI data related to the multi-dimensional query data.

At 1104, non-limiting method 1100 can comprise identifying (e.g., by AI component 204), by the system, based on the FOI data, one or more key frames within the multi-dimensional query data. In one or more embodiments, non-limiting method 1100 can also comprise automatically generating, (e.g., by AI component 204), by the system, annotations based on the one or more key frames.

In various embodiments, identifying the one or more key frames comprises detecting (e.g., by AI component 204) differences between a first frame comprised in the multi-dimensional query data and respective subsequent frames comprised in the multi-dimensional query data, according to non-limiting method 1110.

For example, at 1112, non-limiting method 1110 can comprise adjusting (e.g., by AI component 204), by the system, a similarity threshold based on a range of similarity values associated with respective combinations of frames, wherein each combination of frames of the respective combinations of frames comprises the first frame and a subsequent frame of the respective subsequent frames.

At 1114, non-limiting method 1110 can comprise detecting (e.g., by AI component 204), by the system, based on a decrease in similarity between the first frame and the subsequent frame below the similarity threshold, the subsequent frame as a key frame.

At 1116, non-limiting method 1110 can comprise generating (e.g., by AI component 204), by the system, a set of key frames comprising respective key frames corresponding to the respective combinations of frames.

At 1118, non-limiting method 1110 can comprise determining (e.g., by redundant key frames component 206), by the system, whether some of the key frames comprised in the set of key frames are redundant.

If yes, then at 1120, non-limiting method 1110 can comprise eliminating (e.g., by redundant key frames component 206), by the system, the redundant key frames.

If not, then at 1122, non-limiting method 1110 can comprise preserving (e.g., by redundant key frames component 206), by the system, the key frames as the one or more key frames.

Figure 12:
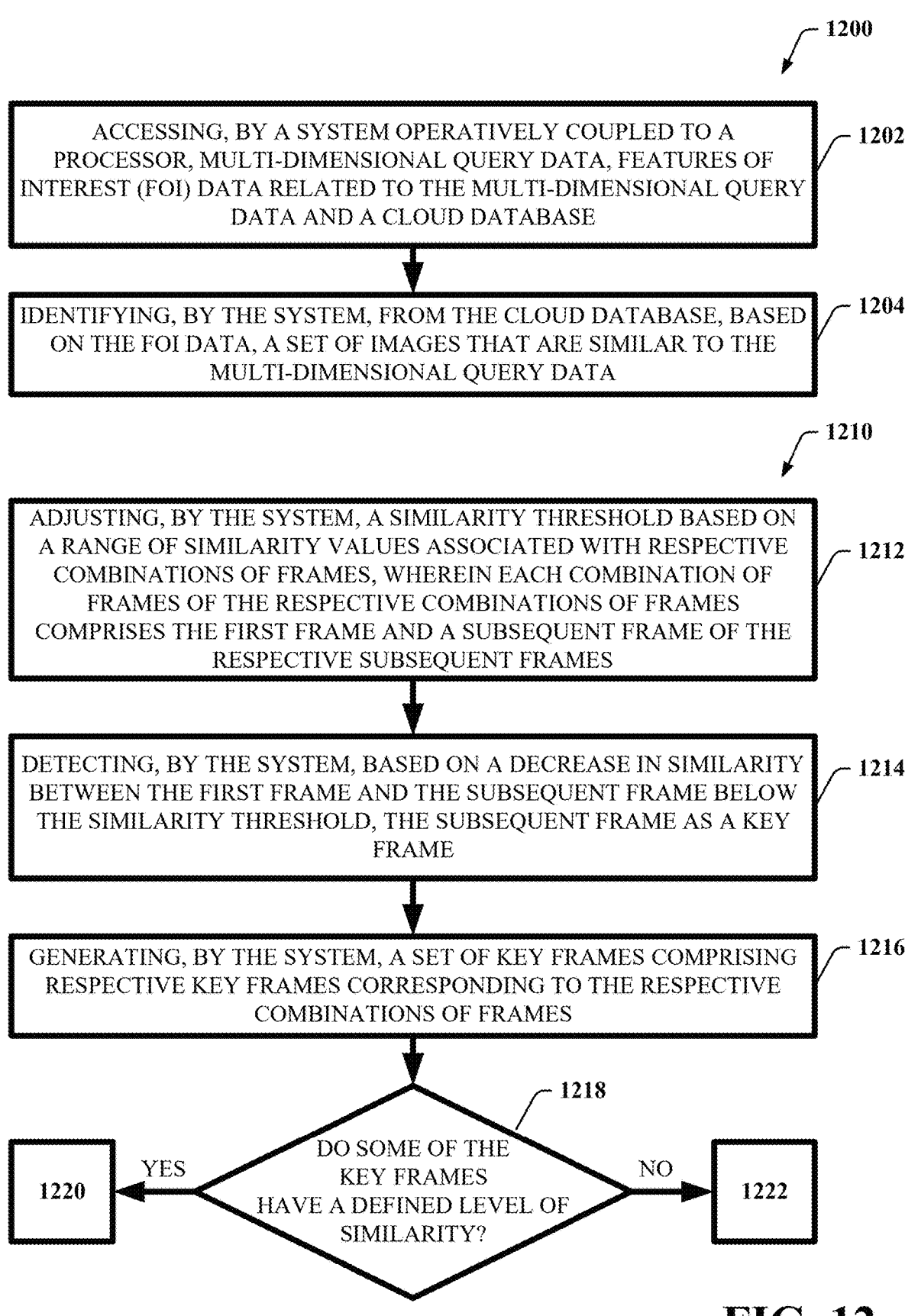
FIG. 12 illustrates flow diagrams of example, non-limiting methods that can employ a foundation model to retrieve images from a cloud database, in accordance with one or more embodiments described herein.

FIG. 12 illustrates flow diagrams of example, non-limiting methods 1200 that can employ a foundation model to retrieve images from a cloud database, in accordance with one or more embodiments described herein. Repetitive description of like elements and/or processes employed in respective embodiments is omitted for sake of brevity.

At 1202, non-limiting method 1200 can comprise accessing (e.g., by data access component 202), by a system operatively coupled to a processor, multi-dimensional query data, FOI data related to the multi-dimensional query data and a cloud database.

At 1204, non-limiting method 1200 can comprise identifying (e.g., by AI component 204), by the system, from the cloud database, based on the FOI data, a set of images that are similar to the multi-dimensional query data.

In various embodiments, identifying the set of images comprises detecting (e.g., by AI component 204) differences between a first frame comprised in a rank filtered database and respective subsequent frames comprised in the rank filtered database, according to non-limiting method 1210, wherein the rank filtered database can comprise images from the cloud database having a first level of similarity to data comprised in the multi-dimensional query data.

For example, at 1212, non-limiting method 1210 can comprise adjusting (e.g., by AI component 204), by the system, a similarity threshold based on a range of similarity values associated with respective combinations of frames, wherein each combination of frames of the respective combinations of frames comprises the first frame and a subsequent frame of the respective subsequent frames.

At 1214, non-limiting method 1210 can comprise detecting (e.g., by AI component 204), by the system, based on a decrease in similarity between the first frame and the subsequent frame below the similarity threshold, the subsequent frame as a key frame.

At 1216, non-limiting method 1210 can comprise generating (e.g., by AI component 204), by the system, a set of key frames comprising respective key frames corresponding to the respective combinations of frames.

At 1218, non-limiting method 1210 can comprise determining (e.g., by redundant key frames component 206), by the system, whether some of the key frames comprised in the set of key frames have a defined level of similarity.

If yes, then at 1220, non-limiting method 1210 can comprise retaining (e.g., by highest similarity level component 210), by the system, the key frames as the set of images.

If not, then at 1222, non-limiting method 1210 can comprise discarding (e.g., by highest similarity level component 210), by the system, the key frames.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ AI to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data. Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=$confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 13:
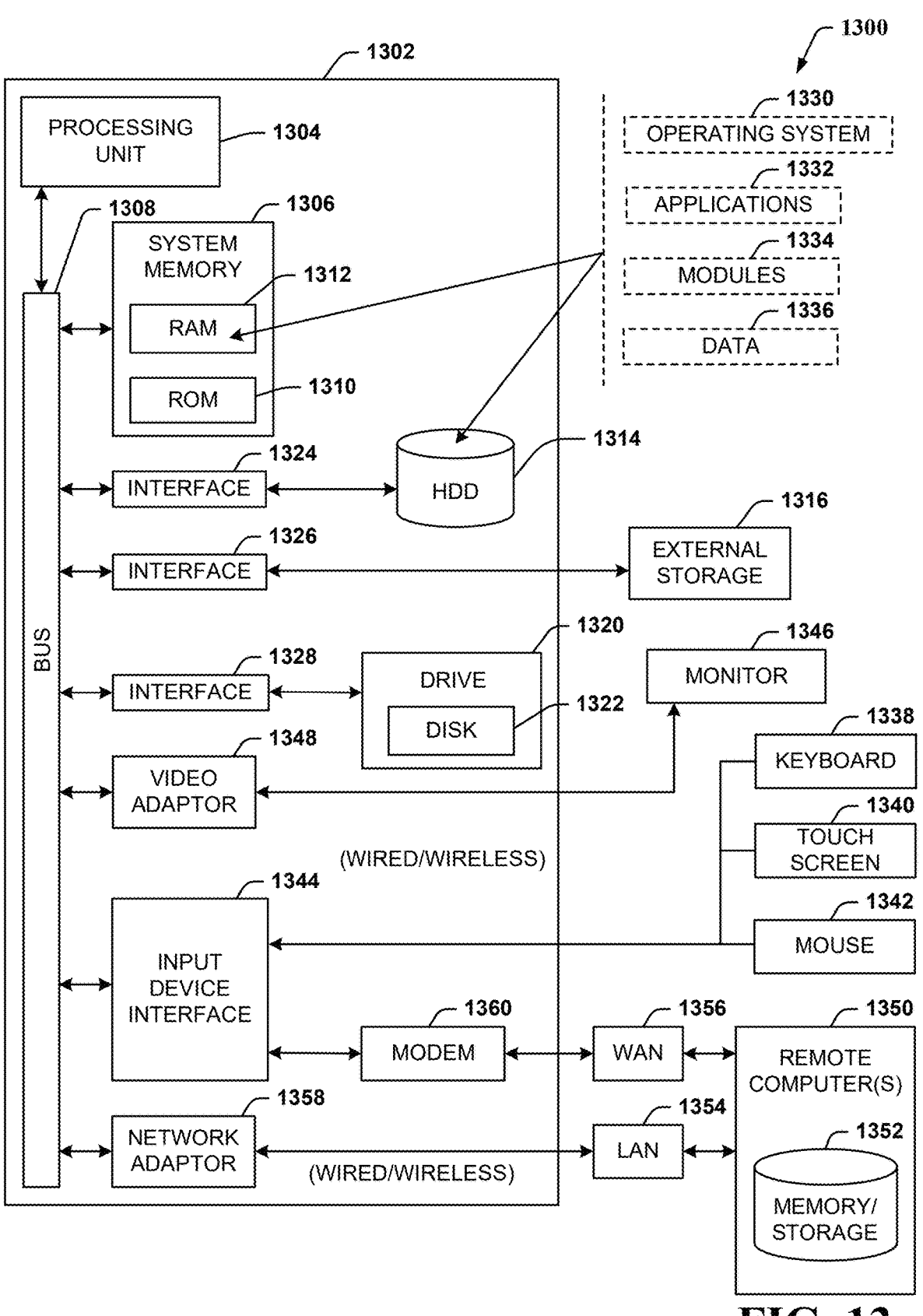
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the OS kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
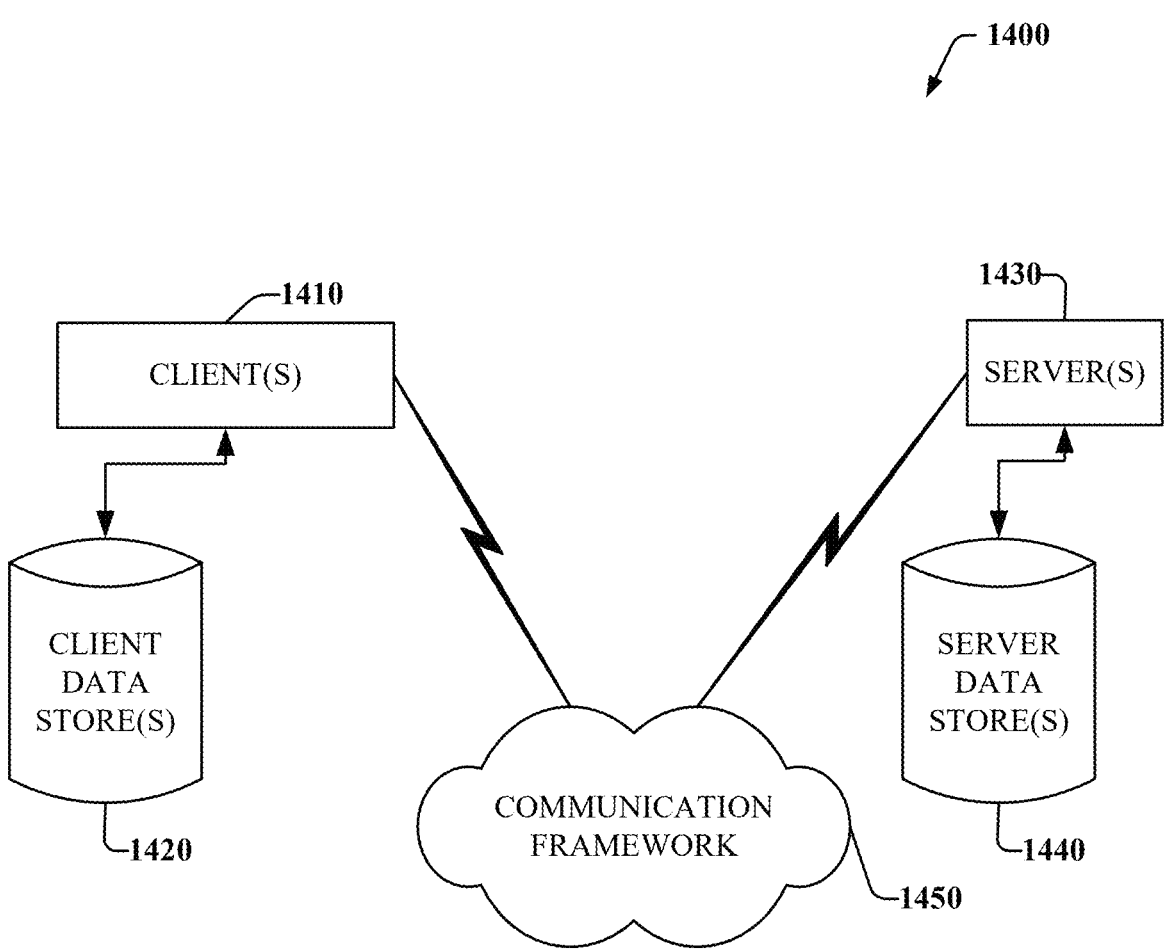
FIG. 14 illustrates an example networking environment operable to execute various implementations described herein.

FIG. 14 is a schematic block diagram of a sample computing environment 1400 with which the disclosed subject matter can interact. The sample computing environment 1400 includes one or more client(s) 1410. The client(s) 1410 can be hardware or software (e.g., threads, processes, computing devices). The sample computing environment 1400 also includes one or more server(s) 1430. The server(s) 1430 can also be hardware or software (e.g., threads, processes, computing devices). The servers 1430 can house threads to perform transformations by employing one or more embodiments as described herein, for example. One possible communication between a client 1410 and a server 1430 can be in the form of a data packet adapted to be transmitted between two or more computer processes. The sample computing environment 1400 includes a communication framework 1450 that can be employed to facilitate communications between the client(s) 1410 and the server(s) 1430. The client(s) 1410 are operably connected to one or more client data store(s) 1420 that can be employed to store information local to the client(s) 1410. Similarly, the server(s) 1430 are operably connected to one or more server data store(s) 1440 that can be employed to store information local to the servers 1430.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
   a data access component that accesses multi-dimensional query data and features of interest (FOI) data related to the multi-dimensional query data;
   a data parsing component that parses the multi-dimensional query data into a sequence of two-dimensional (2D) images;
   an artificial intelligence (AI) component that identifies, based on the FOI data and the sequence of 2D images, one or more key frames within the sequence of 2D images by detecting differences between a first frame comprised in the sequence of 2D images and respective subsequent frames comprised in the sequence of 2D images, wherein the first frame is a query image provided for each of the respective subsequent frames, and wherein the detecting comprises:
      generating, by the AI component, via a dynamic image retrieval (DIR) decoder, output image embeddings of the first frame and output image embeddings of the respective subsequent frames; and
      detecting, by the AI component, via a change point detection and level analysis module, a subsequent frame comprised in the respective subsequent frames as a key frame if a similarity value between the first frame and the subsequent frame is less than a similarity threshold, wherein the similarity threshold represents a degree of similarity between the output image embeddings of the first frame and the output image embeddings of the respective subsequent frames, wherein the detecting further comprises: adjusting, by the AI component, via the change point detection and level analysis module, the similarity threshold based on a range of similarity values associated with respective combinations of frames, wherein the similarity value is comprised within the range of similarity values, wherein each combination of frames of the respective combinations of frames comprises the first frame and a different subsequent frame of the respective subsequent frames; and
      generating, by the AI component, a set of key frames comprising respective key frames corresponding to the respective combinations of frames.

2. The system of claim 1, wherein the detecting the one or more key frames further comprises:
extracting, by a redundant key frames component, the one or more key frames from the set of key frames, wherein the extracting the one or more key frames comprises:
   filtering, by the redundant key frames component, the set of key frames; and
   eliminating, by the redundant key frames component, redundant key frames that comprise redundant information.

3. The system of claim 1, wherein the multi-dimensional query data comprises a sequence of medical images having a format selected from a group consisting of 2D data, three-dimensional (3D) data and four-dimensional (4D) data.

4. The system of claim 1, wherein the AI component is a change detection-based foundation model that further generates, in an automated manner, annotations based on the one or more key frames, and wherein the data parsing component parses the multi-dimensional query data into the sequence of 2D images while maintaining a data sequence of the multi-dimensional query data.

5. The system of claim 1, wherein the FOI data comprises local FOI data, wherein the local FOI data has a format selected from a group consisting of textual data, mask data, points and bounding boxes.

6. The system of claim 1, wherein the FOI data comprises global FOI data, wherein the global FOI data comprises images marked as positive images or negative images.

7. The system of claim 1, wherein the FOI data is provided as a prompt by an entity via a graphical user interface (GUI), wherein the FOI data directs the AI component to focus areas within respective images comprised within the sequence of 2D images, and wherein identifying the one or more key frames based on the FOI data reduces an amount of time spent by the entity in inspecting large temporal data.

8. A computer-implemented method, comprising:
accessing, by a system operatively coupled to a processor, multi-dimensional query data, FOI data related to the multi-dimensional query data and a cloud database;
parsing, by the system, the multi-dimensional query data into a sequence of 2D images;
identifying, by the system, from the cloud database, based on the FOI data and the sequence of 2D images, a set of images that are similar to the multi-dimensional query data by detecting differences between a first frame comprised in a rank filtered database and respective subsequent frames comprised in the rank filtered database, wherein the rank filtered database is derived from the multi-dimensional query data, and wherein the detecting comprises:
   generating, by the system, via a dynamic image retrieval (DIR) decoder, output image embeddings of the first frame and output image embeddings of the respective subsequent frames; and
   detecting, by the system, via a change point detection and level analysis module, a subsequent frame comprised in the respective subsequent frames as a key frame if a similarity value between the first frame and the subsequent frame is less than a similarity threshold, wherein the similarity threshold represents a degree of similarity between the output image embeddings of the first frame and the output image embeddings of the respective subsequent frames, wherein the detecting further comprises: adjusting, by the system, via the change point detection and level analysis module, the similarity threshold based on a range of similarity values associated with respective combinations of frames, wherein the similarity value is comprised within the range of similarity values, wherein each combination of frames of the respective combinations of frames comprises the first frame and a different subsequent frame of the respective subsequent frames; and generating, by the system, a set of key frames comprising respective key frames corresponding to the respective combinations of frames.

9. The computer-implemented method of claim 8, wherein the cloud database comprises first images and embeddings of the first images with varying levels of similarity to the multi-dimensional query data.

10. The computer-implemented method of claim 9, wherein the identifying the set of images comprises:

generating, by the system, based on the first images, the rank filtered database, wherein the rank filtered database comprises second images having a first level of similarity to the multi-dimensional query data.

11. The computer-implemented method of claim 8, wherein the detecting further comprises:

extracting, by the system, the set of images from the set of key frames, wherein the extracting comprises:

filtering, by the system, the set of key frames; and retaining, by the system, key frames having a defined level of similarity to the multi-dimensional query data.

12. The computer-implemented method of claim 8, wherein the multi-dimensional query data comprises a sequence of medical images having a format selected from a group consisting of 2D data, 3D data and 4D data.

13. The computer-implemented method of claim 8, further comprising:

the parsing, by the system, the multi-dimensional query data into the sequence of 2D images while maintaining a data sequence of the multi-dimensional query data.

14. The computer-implemented method of claim 8, wherein the FOI data comprises local FOI data, wherein the local FOI data has a format selected from a group consisting of textual data, mask data, points and bounding boxes.

15. The computer-implemented method of claim 8, wherein the FOI data comprises global FOI data, wherein the global FOI data comprises images marked as positive images or negative images.

16. The computer-implemented method of claim 8, wherein the set of images are identified by an AI component, wherein the DIR decoder is comprised in the AI component, and wherein the DIR decoder is dynamically updated during identification of the set of images.

17. A computer program product comprising a non-transitory computer readable memory having program instructions embodied therewith, the program instructions executable by a processor to cause the processor to:

access multi-dimensional query data, FOI data related to the multi-dimensional query data and a cloud database;

parse the multi-dimensional query data into a sequence of 2D images;

identify, based on the FOI data and the sequence of 2D images, one or more key frames within the sequence of 2D images by detecting differences between a window comprised in a rank filtered database and respective subsequent frames comprised in the rank filtered database, wherein the detecting comprises:

generating, by the processor, via a DIR decoder, output image embeddings of the window and output image embeddings of the respective subsequent frames; and detecting, by the processor, via a change point detection and level analysis module, a subsequent frame comprised in the respective subsequent frames as a key frame if a similarity value between the window and the subsequent frame is less than a similarity threshold, wherein the similarity threshold represents a degree of similarity between the output image embeddings of the window and the output image embeddings of the respective subsequent frames, wherein the detecting further comprises: adjusting, by the processor, via the change point detection and level analysis module, the similarity threshold based on a range of similarity values associated with respective combinations of frames, wherein the similarity value is comprised within the range of similarity values, wherein each combination of frames of the respective combinations of frames comprises the window and a different subsequent frame of the respective subsequent frames;

generating, by the processor, a set of key frames comprising respective key frames corresponding to the respective combinations of frames; and extracting by the processor, the one or more key frames from the set of key frames.

* * * * *